United States Patent
Shinjo et al.

(10) Patent No.: US 8,214,405 B2
(45) Date of Patent: Jul. 3, 2012

(54) LONGEST-MATCH/SHORTEST-MATCH SEARCH APPARATUS, SEARCH METHOD, AND PROGRAM

(75) Inventors: Toshio Shinjo, Chiba (JP); Mitsuhiro Kokubun, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 274 days.

(21) Appl. No.: 12/588,523

(22) Filed: Oct. 19, 2009

(65) Prior Publication Data
US 2010/0042597 A1    Feb. 18, 2010

Related U.S. Application Data

(63) Continuation of application No. PCT/JP2008/000983, filed on Apr. 14, 2008.

(30) Foreign Application Priority Data

May 18, 2007   (JP) ................................. 2007-132289

(51) Int. Cl.
*G06F 17/30* (2006.01)
(52) U.S. Cl. ........................................ 707/797; 707/706
(58) Field of Classification Search .................. None
See application file for complete search history.

(56) References Cited

U.S. PATENT DOCUMENTS

| | | | | |
|---|---|---|---|---|
| 6,029,170 | A * | 2/2000 | Garger et al. ........................ 1/1 |
| 6,389,413 | B2 * | 5/2002 | Takahashi et al. ............ 707/740 |
| 6,594,655 | B2 * | 7/2003 | Tal et al. ........................ 707/797 |
| 6,662,184 | B1 * | 12/2003 | Friedberg ....................... 707/754 |
| 6,675,163 | B1 * | 1/2004 | Bass et al. ............................. 1/1 |
| 6,785,699 | B1 * | 8/2004 | Andreev et al. ............... 708/212 |
| 6,915,300 | B1 * | 7/2005 | Roux et al. .................... 707/706 |

(Continued)

FOREIGN PATENT DOCUMENTS

EP    2 048 584 A1    4/2009

(Continued)

OTHER PUBLICATIONS

Jung, M. et al., "A Dynamic Construction Algorithm for the Compact Patricia Trie using the Hierarchical Structure", Information Processing & Management, Elsevier, Barking, GB LNKD-DOI: 10.1016/S0306-4573(01)00031-0, vol. 38, No. 2, Mar. 1, 2002, pp. 221-236, XP004323332 ISSN: 0306-4573.

(Continued)

*Primary Examiner* — Syed H Hasan
(74) *Attorney, Agent, or Firm* — Rader, Fishman & Grauer PLLC

(57) ABSTRACT

A coupled node tree comprises a root node and a node pair, the node pair being a branch node and leaf node, or a pair of branch nodes, or a pair of leaf nodes located in adjacent storage areas. The branch node includes a discrimination bit position of the search key and a position information of a primary node, which is one node of a node pair of a link target. The leaf node includes an index key that is a bit string that is the target of a search. A coupled node tree is searched using a longest-match/shortest-match search key and the longest-match/shortest-match node is determined through a comparison of the difference bit position between the index key resulting from the search and the longest-match/shortest-match search key and the discrimination bit position of a branch node on the search path memorized when the search is performed.

14 Claims, 13 Drawing Sheets

U.S. PATENT DOCUMENTS

| | | | |
|---|---|---|---|
| 6,934,252 B2* | 8/2005 | Mehrotra et al. | 370/229 |
| 2004/0145777 A1* | 7/2004 | Satomi et al. | 358/1.15 |

FOREIGN PATENT DOCUMENTS

| | | |
|---|---|---|
| JP | 2001-357070 A | 12/2001 |
| JP | 2003-224581 A | 8/2003 |
| JP | 2006-293619 A | 10/2006 |
| JP | 2008-015872 A | 1/2008 |
| JP | 2008-112240 A | 5/2008 |
| WO | WO-08/004335 A1 | 1/2008 |

OTHER PUBLICATIONS

Li, X., et al., "Stateful Inspection Firewall Session Table Processing", School of Computer Science and Technology, Harbin Institute of Technology, International Journal of Information Technology, vol. 11, No. 2, 2005, pp. 21-30.

Communication from European Patent Office for application No. 08738589.4-2201 dated Nov. 5, 2010.

Daichi Goto, "*Sawatte Manabu Data Kozo, Tsukatte Mini Tsuku Algorithm Kochira Java API Kenkyusho!*" Java Press, vol. 34, pp. 202-210 (Feb. 15, 2004).

R. Sedgewich, Algorithm, vol. 1, 1st edition, Kindai Kagaku Sha Co., Ltd. pp. 49-54 (Oct. 10, 1990).

"*Patorishia Tsuri (Patricia Tree)*", vol. 11, No. 2, pp. 337-339, Journal of Japanese Society for Artificial Intelligence (Mar. 1, 1996).

International Search Report for PCT/JP2008/000983, dated Jul. 15, 2008.

Shigeaki Yazaki, "*Zu De Wakaru! Programming No 10 Dai Kisochishiki Data Kozo*," Nikkei Software, vol. 6, No. 2, pp. 44-45 (Jan. 24, 2003).

Office Action dated Dec. 24, 2009 in Japanese application No. 2007-114915.

Nilsson et al., "IP-Address Lookup Using LC-Tries", IEEE Journal on Selected Areas in Communications, vol. 17, No. 6, Jun. 1999, pp. 1083-1092.

Communication from European Patent Office for application No. 08 738 589.4 dated Aug. 9, 2011.

\* cited by examiner

LONGEST-MATCH/SHORTEST-MATCH SEARCH APPARATUS, SEARCH METHOD, AND PROGRAM

CROSS-REFERENCE TO RELATED APPLICATION

This application is a continuation of PCT/JP2008/000983 filed on Apr. 14, 2008, and is based and claims the benefit of priority Japanese Patent Application No. 2007-132289, filed on May 18, 2007, the entire contents of which are incorporated herein by reference. The contents of PCT/JP2008/000983 are incorporated herein by reference in their entity.

BACKGROUND OF THE INVENTION

1. Field of the Invention

The present invention relates to a searching apparatus that searches for a desired bit string from a set of bit strings using a data structure of bit strings stored in a tree and especially relates to the bit string search apparatus, search method, and program using the coupled node tree proposed by this inventor in patent application 2006-187827.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database.

In order to perform the above-noted searching for bit strings at high speed, conventional art makes various refinements on the data structure in which bit strings are stored. One of these is a tree structure known as a Patricia tree.

FIG. 1 shows an example of a Patricia tree used for searching processing in the above-noted conventional art. A node of a Patricia tree is formed to include an index key, a test bit position for a search key, and right and left link pointers. Although it is not explicitly shown, a node of course includes information for the purpose of accessing a record corresponding to the index key.

In the example shown in FIG. 1, the node 1750a that holds the index key "100010" is a root node, the test bit position 1730a of which is 0. The node 1750b is connected to the left link 1740a of the node 1750a, and the node 1750f is connected to the right link 1741a of the node 1750a.

The index key held by the node 1750b is "010011," and the test bit position 1730b is 1. The node 1750c is connected to the left link 1740b of the node 1750b, and the node 1750d is connected to the right link 1741b of the node 1750b. The index key held by the node 1750c is "000111," and the test bit position is 3. The index key held by the node 1750d is "011010," and the test bit position is 2.

The parts connected to the node 1750c by a solid lines show the right and left link pointers of the node 1750c, and the left pointer 1740c that is not connected by the dotted line indicates that that field is blank. The dotted line connection destination of the right pointer 1741c that is connected by a dotted line expresses the address indicated by the pointer, and in this case this indicates that the right pointer points to the node 1750c.

The right pointer 1741d of the node 1750d points to the node 1750d itself, and the node 1750e is connected to the left link 1740d. The index key held by 1750e is "010010," and the test bit position is 5. The left pointer 1740e of the node 1750e points to the node 1750b, and the right pointer 1741e of the node 1750e points to the node 1750e.

The index key held by the node 1750f is "101011," and the test bit position 1730f is 2. The node 1750g is connected to the left link 1740f of the node 1750f and the node 1750h is connected to the right link 1741f of the node 1750f.

The index key held by the node 1750g is "100011," and the test bit position 1730g is 5. The left pointer 1740g of the node 1750g points to the node 1750a, and the right pointer 1741g of the node 1750g points to the node 1750g.

The index key held by the node 1750h is "101100," and the test bit position 1730h is 3. The left pointer 1740h of the node 1750h points to the node 1750f, and the right pointer 1741h of the node 1750h points to the node 1750h.

In the example of FIG. 1, the configuration is such that, as the tree is traversed downward from the root node 1750a the test bit position of successive nodes increases.

When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0.

Unless the test bit position of a link target node is larger than the bit position of the link origin node, that is, if the link target is not below but rather returns upward (the returning links shown by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

In order to resolve these disadvantages of the Patricia tree, there is, for example, the technology disclosed in Patent Reference 1 below. In the Patricia tree described in Patent Reference 1 below, by storing lower level sibling nodes in a contiguous area, the space need for pointers is reduced as well as by setting a bit in each node to show whether or not the next link is a back link the determination processing for back links is reduced.

However, even in the disclosure of Patent Reference 1 below, since each node always reserves an area for the index key and the area for a pointer, and a single pointer is used for storing lower level sibling nodes in a contiguous area as shown for example even in the parts of left pointer 1740c, right pointer 1741h, etc. that are the lowest level parts of the Patricia shown in FIG. 1, the same amount of space must be allocated, etc., and there is not a very big space reduction effect.

Also the problem of the delay in the search processing caused by a back links, and the difficulty of processing such as adding and deleting, etc., is not improved.

Furthermore, among bit string searches there are not only searches for a value that perfectly coincides with a search key but also searches for values that coincide at least partially with the search key. One example is longest-match search (or shortest-match search) where the search is for a key with a range that matches index key coincidence with a search key as long as possible (or short as possible) starting from the highest bit.

Longest-match searches can be used in cases such as routing table searches or broadcast address searches where multiple address transfer is done to transmit data to multiple addresses with the same upper bits. Also shortest-match searches can be used in character string searches using regular expressions or to refine the objects of a search, etc. Therefore it is desirable to speed up these searches and to improve the processing efficiency of various related application areas.

Patent Reference 2 recites an art for speeding up a longest-match search method using a Patricia tree but since the coupled node tree is a new data configuration proposed by this applicant it cannot use previous longest-match search methods.

Patent Document 1: Japanese Published Patent Application 2001-357070

Patent Document 2: Japanese Published Patent Application 2003-224581

SUMMARY OF THE INVENTION

In order to resolve the problems in the above-noted conventional art, in the patent application 2006-187827 the applicant proposed a bit string search (method) using a coupled node tree, which tree is a tree structure for bit string searches formed by a root node and a node pair stored in adjacent areas that is formed by a branch node and a leaf node, branch nodes, or leaf nodes; the root node showing the start point of the tree and being a leaf node if there is only one node in the tree and being a branch node if there are two or more nodes in the tree; the branch node including a discrimination bit position in the search key and information indicating a position of one node of a node pair of a link target; and the leaf node containing index keys that are the target bit strings of a bit string search.

The above cited patent application shows a method for creating a coupled node tree from a set of received index keys and basic search methods using a coupled node tree, such as methods for searching for a single index key from that coupled node tree, etc.

It also explains that the coupled node tree configuration is uniquely stipulated by the set of index keys.

Also the bit string searches may also include various kinds of search requests, such as requests to find a minimum value or maximum value or searches for a value within a given range, etc. Regarding this point, this inventor proposed methods, etc., of obtaining maximum/minimum values of index keys included in any arbitrary subtree of a coupled node tree in patent application 2006-293619.

One purpose of this invention is to propose a longest-match/shortest-match search apparatus, search method, and program having a coupled node tree as the object of the search.

The coupled node tree which is the search object of this invention comprises a root node and a node pair, the node pair being a branch node and leaf node, or a pair of branch nodes, or a pair of leaf nodes arranged in adjacent storage areas. The root node is a node that expresses a starting point of the tree and, which is a leaf node when there is one node in the tree and a branch node when there are two or more nodes in the tree. The branch node includes a discrimination bit position of the search key for the bit string search and the position information indicating a position of a primary node of a node pair, which is one node of a node pair of a link target. The leaf node includes an index key that is a bit string that is the target of a search.

The coupled node tree is configured so that it is executable to perform such a search, by using any arbitrary node of the coupled node tree as the search start node with a search key, that making the search start node as the root node of an arbitrary subtree of the coupled node tree which becomes the object of the search, and performing, in response to a bit value of an index key at the discrimination bit position included in the branch node, repeated linking to the primary node of a node pair of the link target or a node at a position in a memory area adjacent thereto until the leaf node is reached, and obtaining an index key included in the leaf node as a search result key of the arbitrary subtree of the coupled node tree.

The longest-match search method using a coupled node tree in accordance with a preferred embodiment of this invention prepares a search step that performs a search with the root node of the coupled node tree as the search start node and the specified longest-match search key as the search key while backup the path from the root node and acquires the search result key, and a difference bit position acquiring step that compares the bit strings of the longest-match search key and the search result key and acquires the difference bit position with the highest position among the bits that do not match, and a longest-match node setting step that sets the longest-match node, referring to the path that was backed up, when the difference bit position is not the highest position in the bit string, and a longest-match node acquiring step that acquires the root node as the longest-match node if the root node is a leaf node or if the root node is a branch node but the discrimination bit position of the root node is lower than the difference bit position, and, in all other cases, acquires as the longest-match node the leaf node or branch that follows the branch node with the lowest discrimination bit position of all the branch nodes that are on the search path and that have a discrimination bit position higher than the difference bit position.

The shortest-match search method using the coupled node tree according to the preferred embodiment of this invention prepares a search step and difference bit position extracting step that is the same as the above except for a using shortest-match search key instead of a longest-match search key, and a shortest-match node setting step that sets the shortest-match node, referring to the path that was backed up, when the above difference bit position is not the highest position in the bit string, and a shortest-match node setting step that, if the discrimination bit position of the root node is a higher position than the difference bit position, sets as the shortest-match node the node number 2 that, of the node pair that is the link target of the node number 1, is the node of the pair that is not stored in the path, the path including the root node and the node number 1 that is one of the node pair that is a link target of the root node.

In accordance with the preferred embodiment of this invention a longest-match/shortest-match search becomes possible with a coupled node tree as the object of the search.

Consequently, various fields that require a longest-match/shortest-match search can use a coupled node tree.

Since a coupled node tree is configured in a way to speed up the search, a longest-match/shortest-match search using a coupled node tree will be fast.

Consequently, high speed processing of a longest-match/shortest-match search in various fields can realized.

DESCRIPTION OF THE PREFERRED EMBODIMENTS

First the coupled node tree premised in this invention and proposed by this applicant previously in the above cited applications is described using an example of storing a coupled node tree in an array. Although it is possible to use address information in a storage device as the data indicating the position of a link target held in a branch node, by using an array formed by array elements that can store the larger of the occupied storage capacity area between a branch node and a leaf node, it is possible to express the node position as an array element number, enabling a reduction of the amount of position information.

Figure 2A:
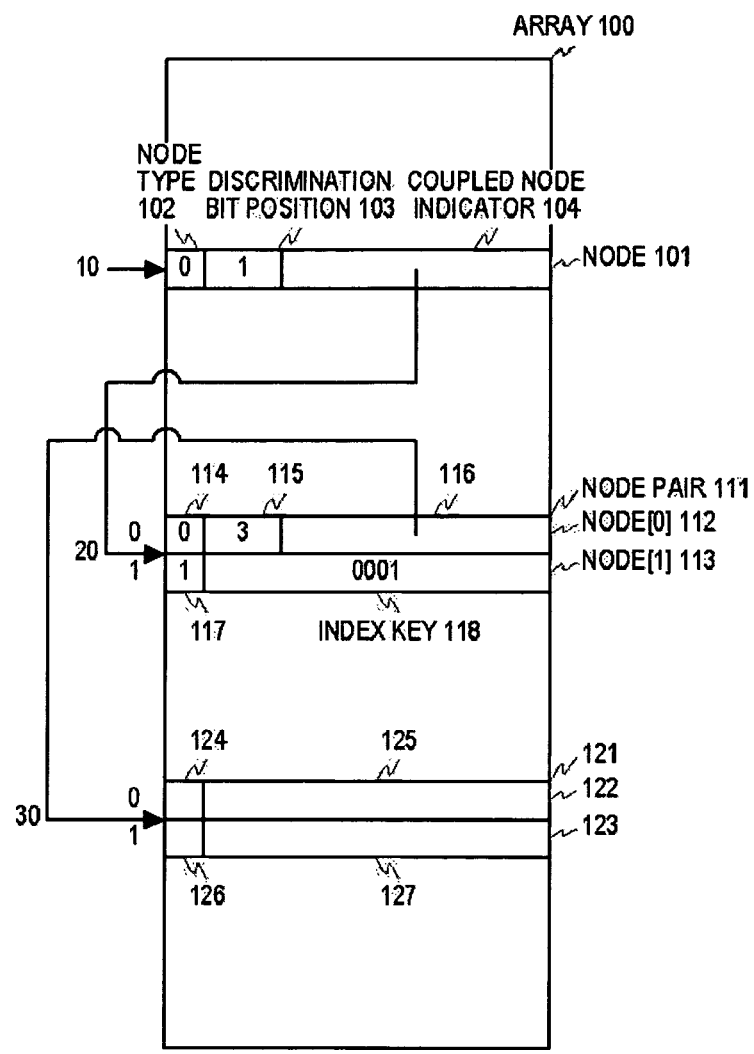
FIG. 2A is a drawing describing an exemplary configuration of a coupled node tree stored in an array.

FIG. 2A is a drawing that describes an exemplary configuration of a coupled node tree that is stored in an array.

Referring to FIG. 2A, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0] 112, which is the primary node of the node pair 111. The secondary node [1] 113 forming a pair with the primary node is stored into the next, adjacent, array element (array element number 20+1). The value 0 is stored in the node type 114 of the node [0] 112, the value 3 is stored in the discrimination bit position 115, and the value 30 is stored in the coupled node indicator 116. The value 1 is stored in the node type 117 of the node [1] 113, thereby indicating that the node [1] 113 is a leaf node. The value "0001" is stored in the index key 118. In the same manner as in a Patricia tree described above, although information for accessing a record corresponding to an index key is of course included in a leaf node, this is omitted from the notation.

Primary nodes are indicated as the node [0], and secondary nodes that are paired therewith are indicated as the node [1]. Also the node stored in an array element with some array element number is called the node of that array element number and the array element number stored in the array element of that node is also called the array element number of the node.

The contents of the node pair 121 formed by the node 122 and the node 123 that are stored in the array elements having array element numbers 30 and 31 are not shown.

The 0 or 1 that is appended to the node [0]112, the node [1]113, the node 122, and the node 123 indicates respectively to which node of the node pair linking is to be done when performing a search using a search key. Linking is done to the node having an array element number that is derived by adding the 0 or 1, which is the bit value of the search key at the discrimination bit position of the immediately previous branch node, to the coupled node indicator of the branch node.

Therefore, by adding the bit value of the discrimination bit position of the search key to the coupled node indicator of the immediately previous branch node, it is possible to determine the array element number of an array element storing a node at the link target.

Although in the above-noted example the smaller of the array element numbers at which the node pair is located is used as the coupled node indicator, it will be understood that it is also possible to use the larger of the array element numbers in the same manner.

Figure 1:
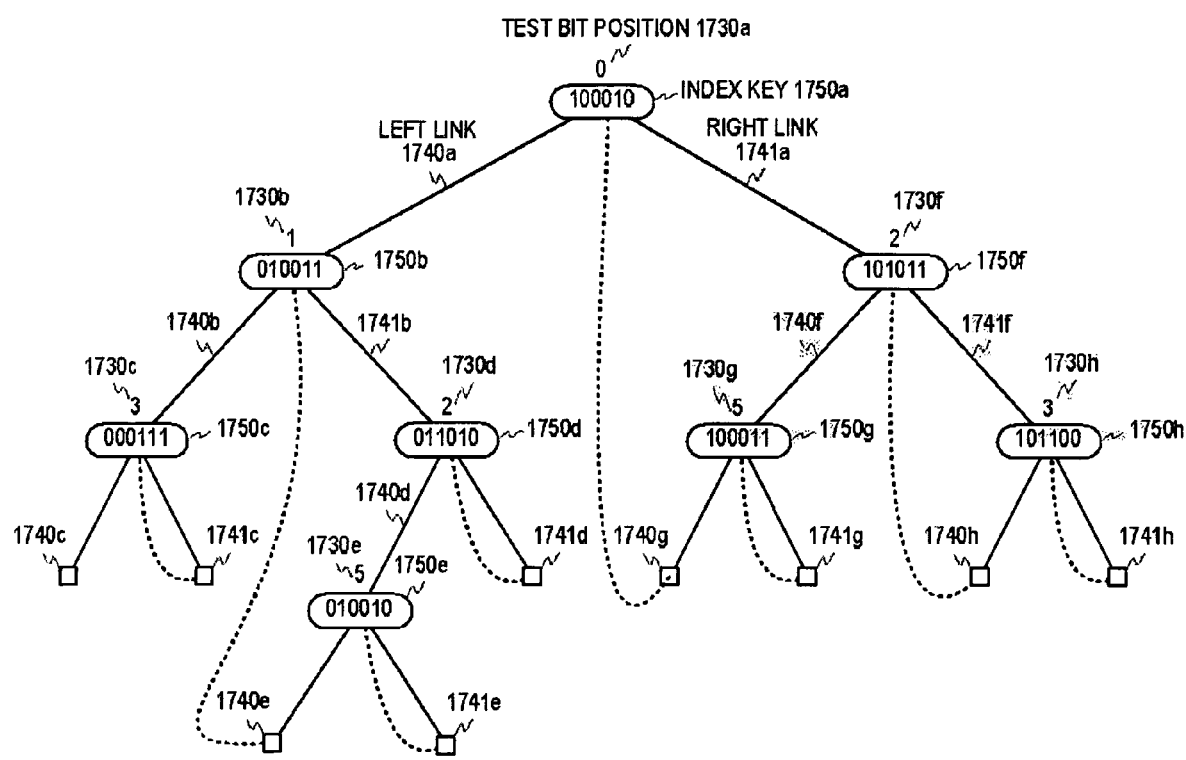
FIG. 1 is a drawing showing an example of a Patricia tree used in searching in the past.
Figure 2B:
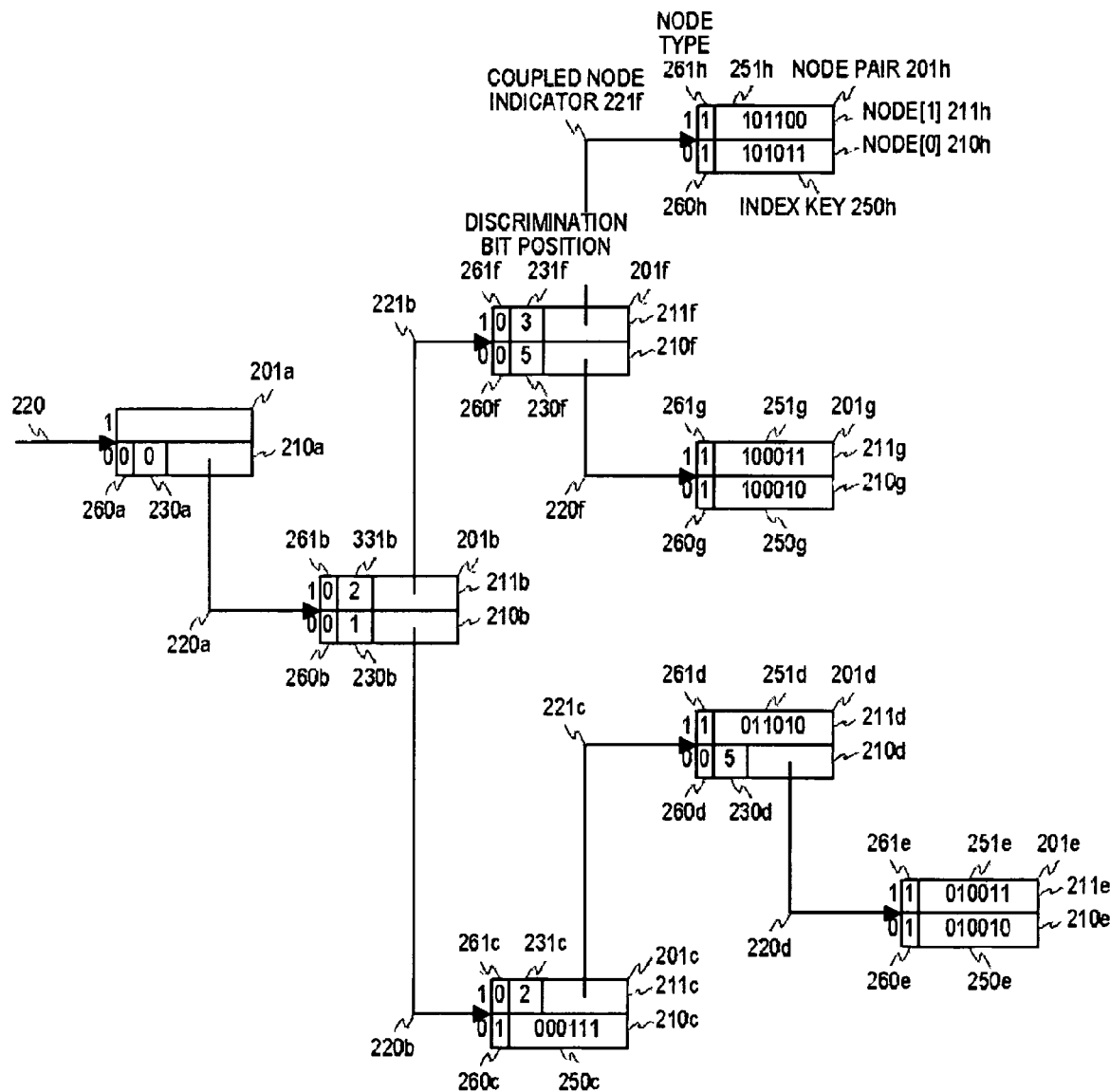
FIG. 2B is a drawing describing a tree structure of a coupled node tree.

FIG. 2B is a drawing that conceptually shows an embodiment of a tree structure of a coupled node tree. The 6-bit index key that is illustrated is the same as that of the Patricia tree shown as an example in FIG. 1.

The reference numeral 210a shows the root node. In the example shown, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 1. The tree is traversed in accordance with the bit values at discrimination bit positions of the search key, so that the leaf node of the search for item is found.

In the example shown, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes an index key. "000111" is stored in the index key 250c. The node type 261c of the node 211c is 0, the discrimination bit position 231c of the node 211c is 2, and in the coupled node indicator is stored the array element number 221c of an array element in which is stored the primary node 210d of the node pair 201d.

The node type 260d of the node 210d is 0, the discrimination bit position 230d of the node 210d is 5, and in the coupled node indicator is stored the array element number 220d of an array element in which is stored the primary node 210e of the node 201e. The node type 261d of the node 211d that is paired with the node 210d is 1, and "011010" is stored in the index key 251d.

The node types 260e and 261e of the nodes 210e and 211e of the node pair 201e are both 1, indicating that both are leaf nodes. In the index keys 250e and 251e of each are stored "010010" and "010011" respectively as index keys. The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the discrimination bit positions 230f and 231f of each are stored 5 and 3, respectively. The array element number 220f of the array element in which is stored the primary node 210g of the node pair 201g is stored in the coupled node indicator of the node 210f, and the array element number 221f of an array element in which is stored the node [0] 210h, which is the primary node of the node pair 201h, is stored in the coupled node indicator of the node 211f.

The node types 260g and 261g of the nodes 210g and 211g of the node pair 201g are both 1, indicating that both are leaf nodes, and "100010" and "100011" are stored in the index keys 250g and 251g thereof, respectively.

In the same manner, the node types 260h and 261h of the node [0] 210h of the node pair 201h, and the node [1] 211h, which is paired therewith, are both 1, indicating that both are leaf nodes, and "101011" and "101100" are stored in the index keys 250h and 251h thereof, respectively.

The processing flow in searching for the index key "100010" from the above-noted tree is briefly described below. The discrimination bit positions are numbered 0, 1, 2, . . . and so on from the left.

First, processing is started from the root node 201a using the bit string "100010" as the search key. Because the discrimination bit position 230a of the root node 210a is 0, examining the bit value of the discrimination bit position 0 reveals 1. This being the case, 1 is added to the array element number 220a stored in the coupled node indicator and linking is done to the node 211b stored in the resulting array element number. Because 2 is stored in the discrimination bit position 231b of the node 211b, examination of the bit value of the discrimination bit position 2 reveals 0, resulting in linking to the node 210f stored in the array element having the array element number 221b stored in the coupled node indicator.

Because 5 is stored in the discrimination bit position 230f of the node 210f, and because examination of the bit value of the discrimination bit position 5 of the search key "100010" reveals 0, linking is done to the node 210g stored in the array element having the array element number 220f stored in the coupled node indicator.

Because the node type 260g of the node 210g is 1, indicating a leaf node, the index key 250g is read out and a comparison is performed with the search key, thereby revealing coincidence between the two, both of which are "100010". Searching is performed in this manner using the coupled node tree.

Next, the significance of the configuration of the coupled node tree will be described, with reference made to FIG. 2B.

The configuration of the coupled node tree is defined according to a set of index keys. In the example of FIG. 2B, the discrimination bit position of the root node 210a is 0 because there is an index key having a 0 at the 0th bit and an index key having a 1 at the 0th bit in the index keys shown in the embodiment example of FIG. 2B. The group of index keys having 0 at the 0th bit is classified under the node 210b, and the group of index keys having 1 at the 0th bit is classified under the node 211b.

That the discrimination bit position of the node 211b is 2 reflects a property of the index keys, this being that the 1st bits of all the nodes 211h, 210h, 211g, and 210g are the same value 0, a difference therebetween first occurring at the 2nd bit.

Similar to the case of the 0th bit, the cases of the 2nd bit being 1 are classified on the node 211f side, and the cases of the 2nd bit being 0 are classified on the node 210f side.

Then because index keys having a 2nd bit that is 1 differ with regard to the 3rd bit, 3 is stored in the discrimination bit position of the node 211f, and because the 3rd and 4th bits of index keys having 0 as the 2nd bit are the same and differ at the 5th bit, 5 is stored in the discrimination bit position of the node 210f.

At the link target of the node 211f, because there is only one having a 3rd bit of 1 and one having a 3rd bit of 0, nodes 210h and 211h are leaf nodes, with "101011" and "101100" stored in the index keys 250h and 251h, respectively.

Even in the event that the index key set includes "101101" or "101110" in place of "101100," because there is equality with "101100" up until the 3rd bit, only the index key stored in the node 211h would change, there being no change in the structure of the tree itself. However, if "101101" is included in addition to "101100," the node 211h would become a branch node, the discrimination bit position thereof being 5. If the index key to be added is "101110," the discrimination bit position would be 4.

As described above, the coupled node tree structure is determined by the bit values of each bit position of the index keys included in the set of index keys.

To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "101100" for the index key 251h of the node 211h, "101011" for the index key 250h of the node 210h, . . . , and "000111" for the index key 250c of the node 210c, these being sorted in descending order.

That is, in a coupled node tree the index keys are disposed in the tree in a sorted sequence.

When searching using a search key, the index key is followed over a path disposed on a coupled node tree, and in the case, for example of a search key "101100" it is possible to reach the node 211h. As can be imagined from the above-noted description, even if the search key is made "101101" or "101110," the node 211h will be reached, and a comparison with the index key 251h will result in the search failing.

Also, even in the case in which searching is done with "100100," in the search path of nodes 210a, 211b, and 210f, because the 3rd and 4th bits of the search key are not used and the 5th bit is 0, the node 210g will be reached, similar to the case searching with "100010." In this manner, the discrimination bit positions are used in accordance with bit makeup of the index keys stored in the coupled node tree to perform branching.

Figure 3:
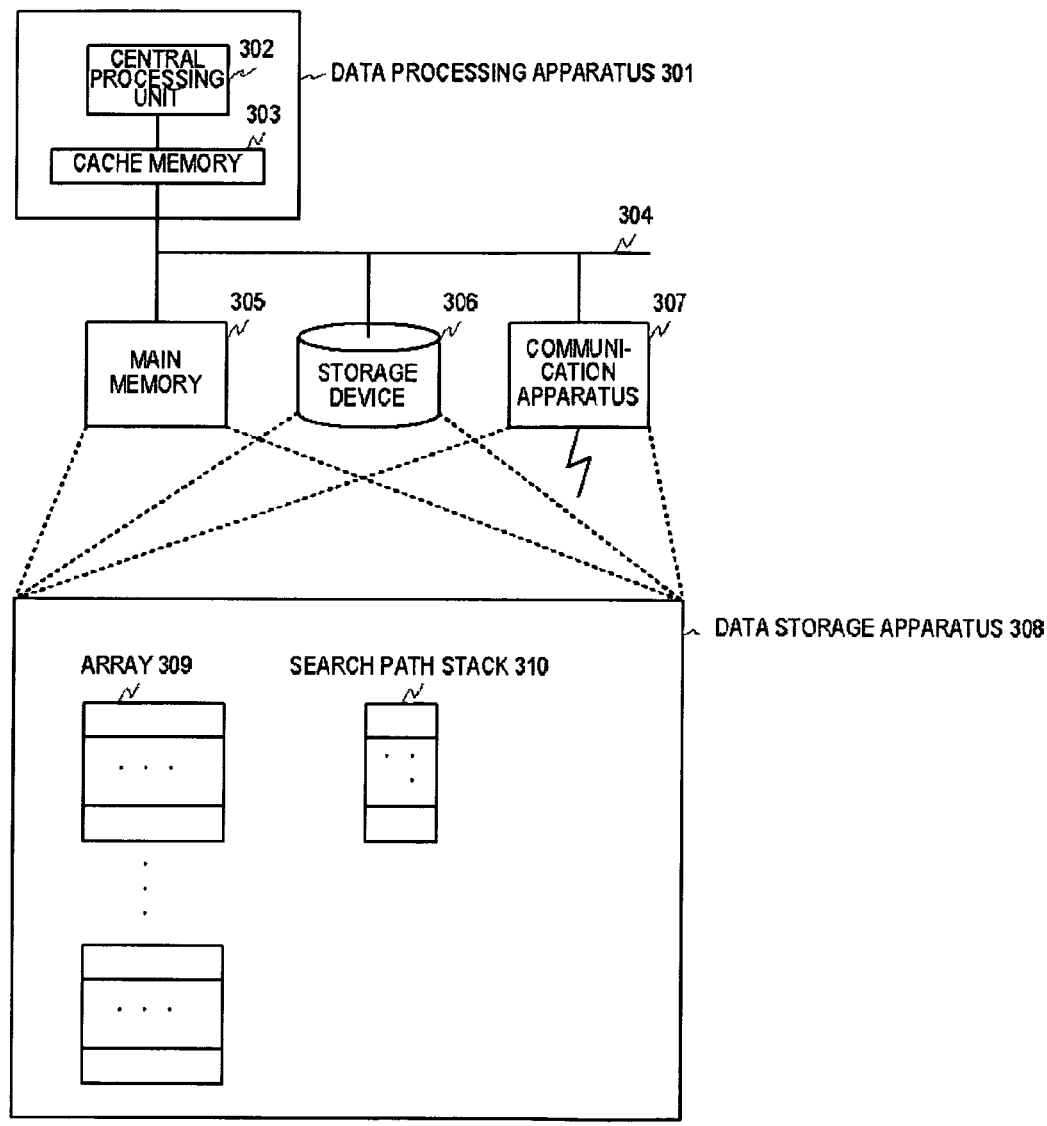
FIG. 3 is a drawing describing an exemplary hardware configuration for embodying the present invention.

FIG. 3 is a drawing describing an example of a hardware configuration for embodying the present invention.

Search processing and data maintenance are implemented with the searching apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search, can be implemented by a main memory 305 or a storage device 306, or alternatively, by using a remotely disposed apparatus connected via a communication apparatus 307.

The array 100 in FIG. 2A is one embodiment of the array 309.

In the example shown in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing.

Next, the basic search processing using the coupled node tree proposed by this inventor in the previously cited patent application and some of the applied processing, such as the processing that obtains the maximum/minimum values for the index keys included in the coupled node tree, will be introduced to the extent necessary to understand this invention.

Figure 4:
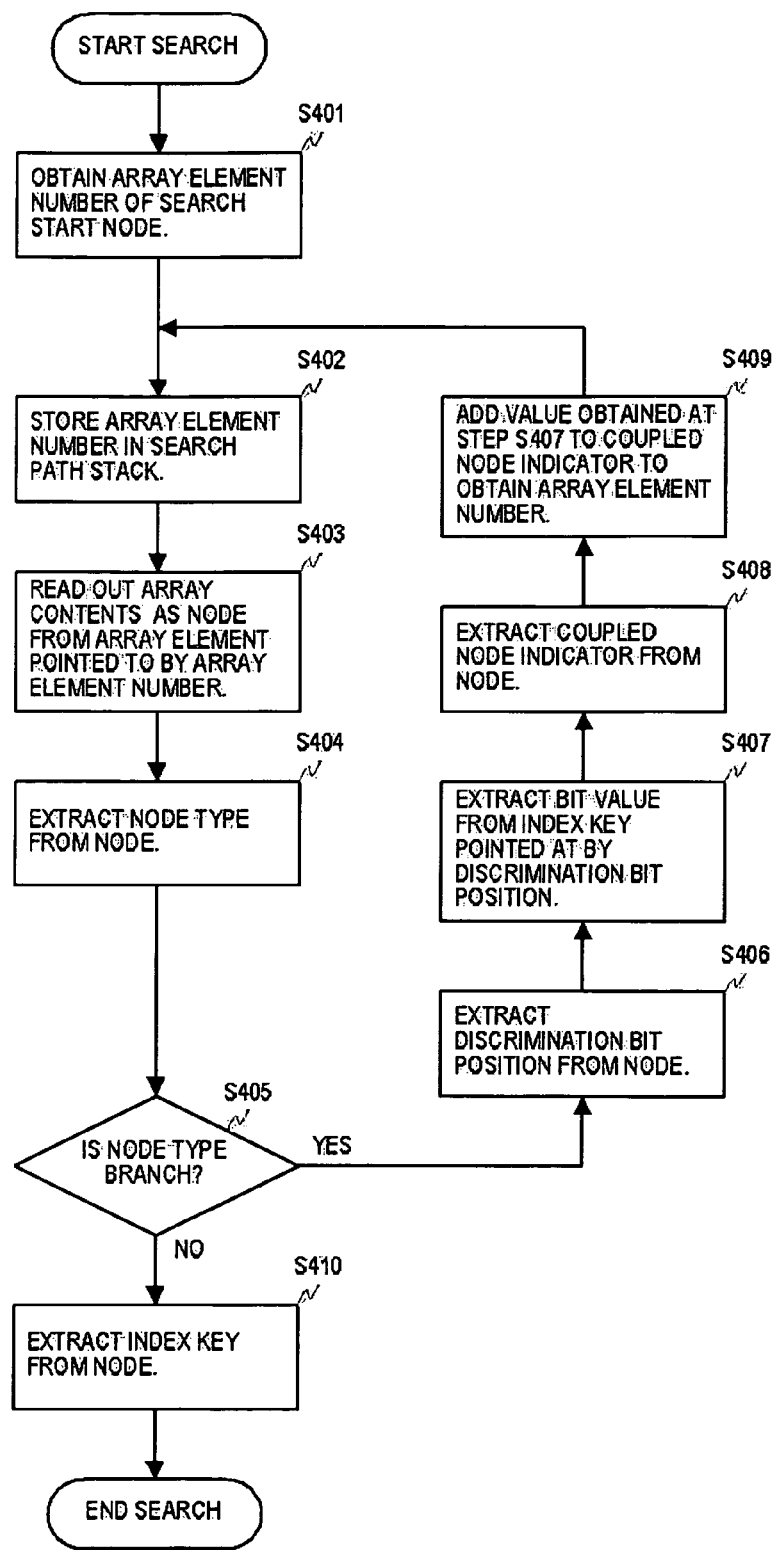
FIG. 4 is a flowchart showing the search processing related to the present invention.

FIG. 4 is a flowchart showing the basic operations of the bit string search processing proposed by this applicant in the above cited application 2006-293619.

First, in step S401 the array element number of the search start node is acquired.

The search start node can be any node configuring the coupled node tree and it is stored in the array position that corresponds to the acquired array element number.

How the search start node is specified will be described later in the descriptions of the various search applications.

Next, at step S402, the array element number acquired is stored on the search path stack 310. Proceeding to step S403, the array element of the array element number is read out as a node to be referenced. At step S404, the node type is extracted from the read out node. Next at step S405, a determination is made as to whether the node type is a branch node or not.

If the determination made at step S405 is that the node type is a branch node, processing proceeds to step S406. At step S406, the discrimination bit position is extracted from the node. Next, at step S407, the bit value of the search key at the discrimination bit position extracted at step S406 is obtained. Next, proceeding to step S408, the array element number of the primary node of the node pair of the link target is obtained from the node. Then, proceeding to step S409, the bit value obtained at step S407 is added to the array element number obtained at step S408, thereby obtaining the array element number of the link target node, and return is made to step S402.

Thereafter, the processing from step S402 to step S409 is repeated until the determination at step S405 is that the node is a leaf node and processing proceeds to step S410. At step S410, the index key is extracted from the leaf node, and processing ends.

The above was a detailed description of the basic operations for bit string searches based on this invention. The generation of a coupled node tree has not been specifically shown in drawings but as was described in the above cited application by this applicant, when there is a set of bit strings, the tree can be generated by repeating the operation of extracting any bit string successively from that set and inserting it into the tree as an index key.

As was described above, from the fact that an index key value stored in a coupled node tree will be placed in the tree sorted in descending order by traversing the node [1] side down the tree in the depth direction, the index key insertion processing consists of taking the index key to be inserted as a search key and searching a coupled node tree for the corresponding leaf node, and successively storing in a stack the array element number of the array elements stored in the branch node and related leaf node of the search path from traversing the tree until reaching the related leaf node, and by making a value comparison and a bit string comparison between the search key and the index key contained in the corresponding leaf node, the insertion position of the node pair composed of the leaf node containing the index key to be inserted and another node is decided by the relative position relation between the discrimination bit positions of the branch nodes stored in the stack and the first bit position that differs in the bit string comparison, and the above value relationship determines into which of the nodes within a node pair the leaf node that contains the index should be inserted.

Figure 5:
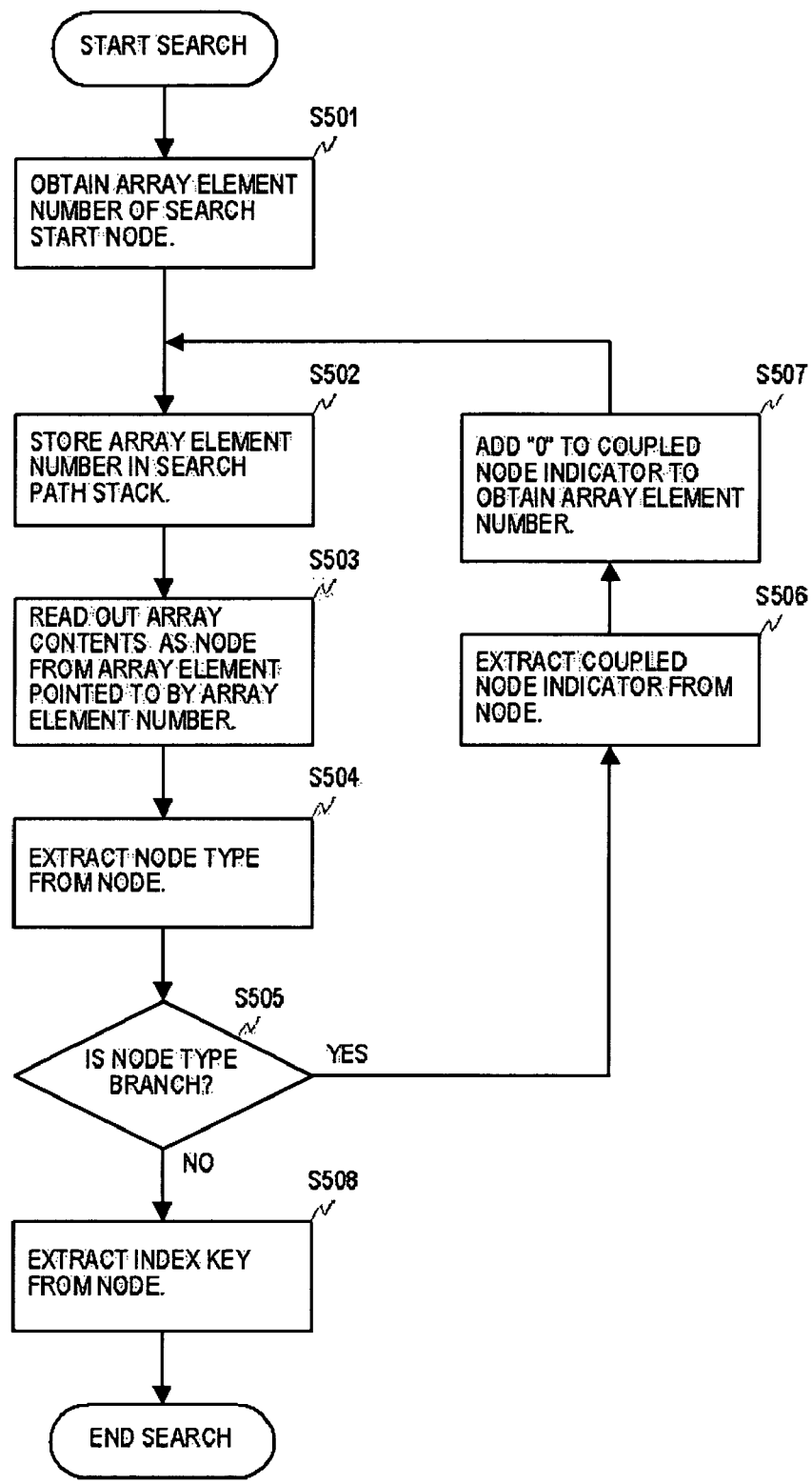
FIG. 5 is a drawing showing the processing when requesting the minimum key value stored in a coupled node tree.

The flowchart in FIG. 5 is the flowchart for obtaining the minimum value of the index keys stored in a coupled node tree (including subtrees) proposed in Japanese Patent Application 2006-293619, previously filed by the applicants of the present invention. As was noted above regarding the position of the index keys on the tree, the processing to obtain the minimum value of the index keys is equivalent to traversing nodes [0] from the search start node until a leaf node is reached.

First, the processing from the acquiring of the array element number of the search start node at step S501 until the node type determination at step S505 is similar to the processing from step S401 to step S405 of FIG. 4.

If the node type is determined to be branch node at the node type determination made at step S505, processing proceeds to step S506, at which the primary node indicator of the array is extracted from the node and, at step S507, the value "0" is added to the extracted primary node indicator and taken as the new array element number, after which return is made to step S502. Thereafter, the processing from step S502 to step S507 is repeated until the node is determined to be leaf node at step S505, and at step S508 the index key is extracted from the leaf node, at which time processing ends.

In the above-noted processing shown in FIG. 5, in order to traverse the node [0], "0" is always added to the coupled node indicator. That is, according to the processing of FIG. 5, the node of a link target is always taken as the node [0] of a node pair, and branching is done to the node storing the index key with the smaller value. By doing this, the tree structure enables extraction of the minimum index key of the coupled node tree, which is a sequentially configured as described above.

Also, in a method similar to that of FIG. 5, it is natural that a maximum value of the index keys stored in a coupled node tree (including a subtree) can be obtained. Specifically, if the processing of step S507 in FIG. 5 is changed such that a "1" instead of a "0" is added, the maximum values of the index keys can be obtained. By such a change, the node [1] of a node pair pointed to by a coupled node indicator is always linked to and the hierarchy of the tree structure can be successively traversed to a leaf node.

As shown in FIG. 4 and FIG. 5, when executing the basic operation of searching for an index that coincides with a search key or executing the search processing for a minimum/maximum value of the search keys, the referenced array element numbers of the array are successively stored in search path stack 310.

Also in the search processing for a minimum/maximum value of the search keys referenced in the above description of FIG. 5, the explanation treated the coupled node tree as if it were stored in an array, but there is no need for the coupled node tree to be stored in an array and it is clear that a search for a minimum/maximum value of the search keys can be done by linking only to the primary node of the two nodes that configure a node pair or only to the node that is disposed in the area adjacent to the primary node, until a leaf node is reached.

Next, a longest-match/shortest-match search of a coupled node tree according to the preferred embodiment of this invention is described. First the terminology used in the preferred embodiment and the conditions presupposed for the preferred embodiment are described.

(a) A longest-match search is the search processing that searches for the index key that has a difference bit position with the lowest position (larger value) of the index keys that prefix match the longest-match search key that is specified as the search key. That index key is defined as the index key that satisfies the longest-match condition. There are cases where no index exists that satisfies the longest-match condition and cases where one or more may exist. Also a difference bit position expresses the highest position of the bits that do not match when two bit strings are compared.

(b) A shortest-match search is the search processing that searches for the index key, on a priority basis, that has a difference bit position with the highest position (smallest value) of the index keys that prefix match the shortest-match search key that is specified as the search key. Depending on the preferred embodiment it is permitted to have different details in the definition of shortest-match. In the preferred embodiment below, "shortest-match" is defined as follows and the shortest-match search method is described in detail.

The index key that satisfies the condition that the bit values of the root node perfectly coincide with the bit values of the shortest-match search key up to the discrimination bit position of the root node and the condition that in the bit values after the discrimination bit position of the root node there is non-coincidence is defined as an index key that satisfies the shortest-match condition.

There are cases where no index exists that satisfies the longest-match condition and cases where one or more may exist.

Next, a detailed method for a longest-match search in a coupled node tree is described referencing FIG. 6, FIG. 8, FIG. 10, and FIG. 11.

Figure 6:
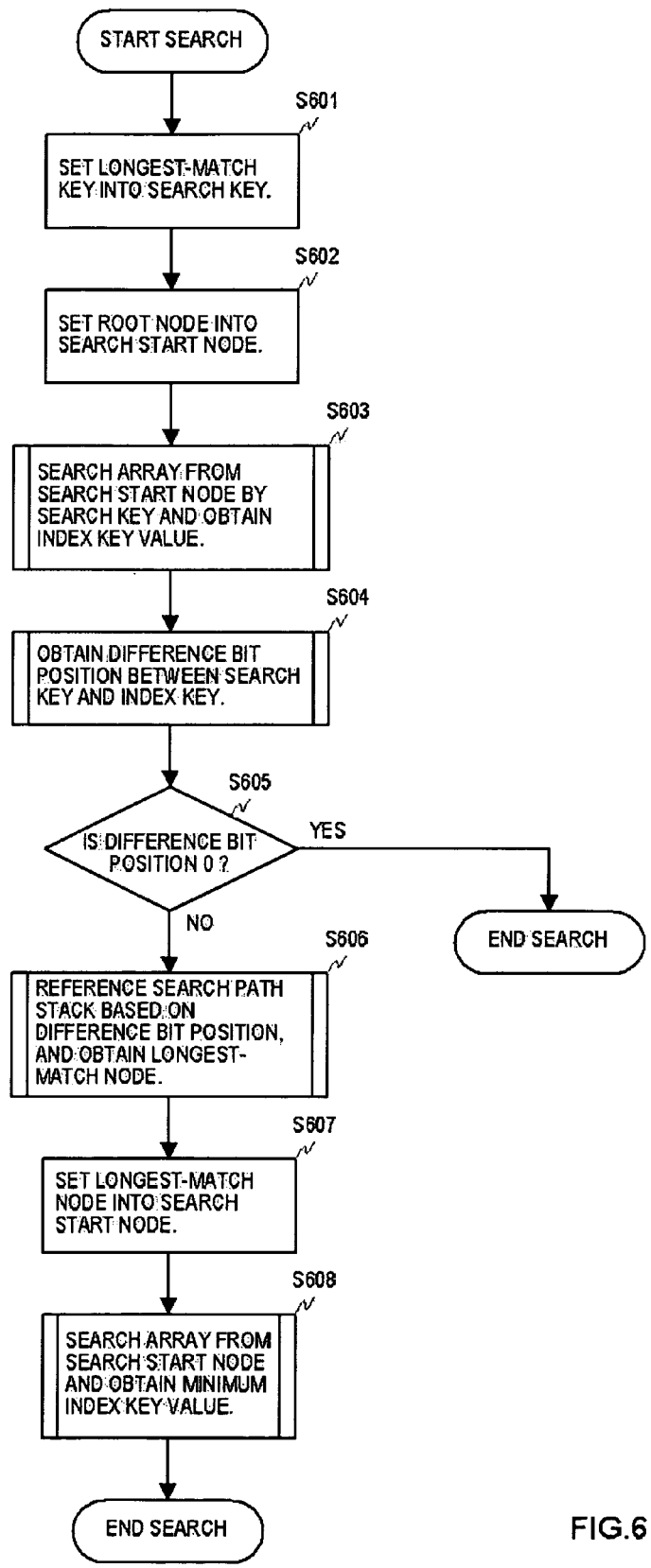
FIG. 6 is a flowchart showing the longest-match search processing according to the preferred embodiment of this invention.

FIG. 6 is a flowchart of the longest-match search processing in one preferred embodiment of this invention.

A summary the processing in FIG. 6 is that steps S601 to S606 extract the longest-match node and steps S607 to S608 extract one index key from the subtree that has the longest-match node as its root node.

Also when all the index keys of leaf nodes included in a subtree satisfy the longest-match condition, the root node of that subtree is defined as the longest-match node.

Consequently, the index key(s) acquired in steps S607 to S608 satisfy the longest-match condition.

More details of the processing of FIG. 6 are provided below.

In step S601 the specified longest-match search key is set in the search key and in step S602 the root node of the coupled node tree is set as the search start node.

Next, in step S603, the array 309 is searched using the search key set in step S601 and an index key is acquired.

This search is the same as shown in FIG. 4.

Since, in step S602, the root node is set as the search start node, the whole coupled node tree is the object of the search.

The contents stored in search path stack 310 during the search in step S603 is used later in step S606.

After the index key is acquired in step S603, processing proceeds to step S604 and a difference bit position is obtained between the search key specified in step S601, i.e., the longest-match search key, and the index key acquired in step S603.

The details of this processing will be explained later along with FIG. 10.

Next, in step S605, a determination is made whether the difference bit position obtained in step S604 is 0.

If the difference bit position is 0, the determination is "Yes" and longest-match search processing is terminated.

In this case the longest-match search key and the index key acquired in step S603 have a non-coincidence in the leading bit 0.

Also, given the configuration of a coupled node tree, all the other index keys included in the coupled node tree also have a non-coincidence on the leading bit 0.

Consequently, since no leaf node within the tree includes an index key that satisfies a partial match condition, the result "No index key exists that satisfies the longest-match condition" is obtained.

If the difference bit position is not 0, the determination in step S605 becomes "No" and processing proceeds to step S606.

In this case there is at least 1 index key in the coupled node tree that satisfies the longest-match condition.

However, since, at the stage of step S605, only the existence of an index key that satisfies the longest-match condition has been ascertained, in step S606, a specific longest-match node is acquired.

In step S606, the element numbers of array 309 stored in search path stack 310 during the search of step S603 are referenced and the longest-match node is acquired based on the difference bit position obtained in step S604.

After acquiring the longest-match node, the longest-match node is set in the search start node in the following step S607.

Next, in the following step S608, the minimum value search processing shown in FIG. 5 is executed from the search start node, and the minimum value of the index keys that satisfy the longest-match condition is acquired, and the minimum value obtained is output as the result of the longest-match search and longest-match search processing terminates.

Also various changes are possible in steps S607 and S608, depending on the preferred embodiment.

Choosing a minimum value from among one or more index keys that satisfy the longest-match condition as in this preferred embodiment is nothing more than one example of possible processing.

Examples of other variations are explained later.

Figure 10:
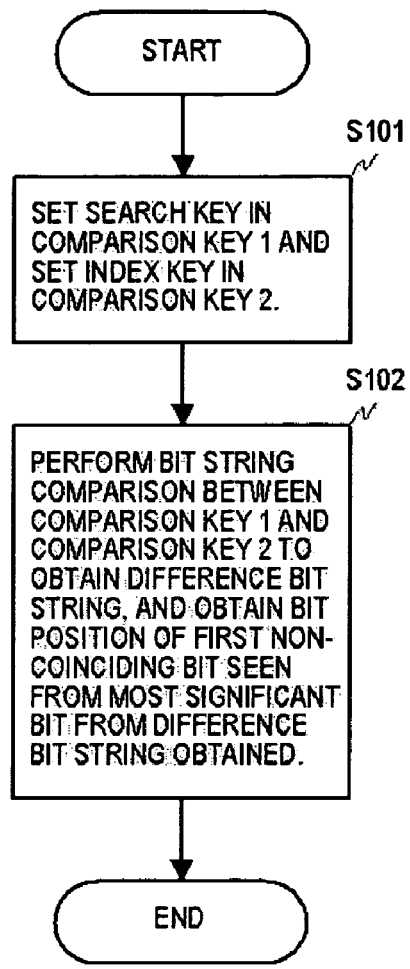
FIG. 10 is a flowchart showing the processing for acquiring the difference bit position.

Next, the processing of step S604 in FIG. 6 is described, referencing FIG. 10.

As will be described later, the processing of FIG. 10 is also called out from shortest-match search processing.

In step S101, the search key is set in comparison key 1, and the index key is set in comparison key 2.

In the case of longest-match search processing, here the "search key" is the longest-match search key set in step S601, and the "index key" is the index key acquired in step S603.

Next, in step S102, the bit strings of comparison key 1 and comparison key 2 are compared sequentially from the highest position of the 0th bit.

Of the bits that do not coincide between comparison key 1 and comparison key 2, the first non-coincident bit discovered is acquired as the difference bit position and the processing of FIG. 10 is terminated.

It is clear from the above description that, if the processing of FIG. 10 is called out from step S604 in FIG. 6, step S102 acquires the difference bit position between the longest-match search key and the index key acquired in step S603.

Figure 8:
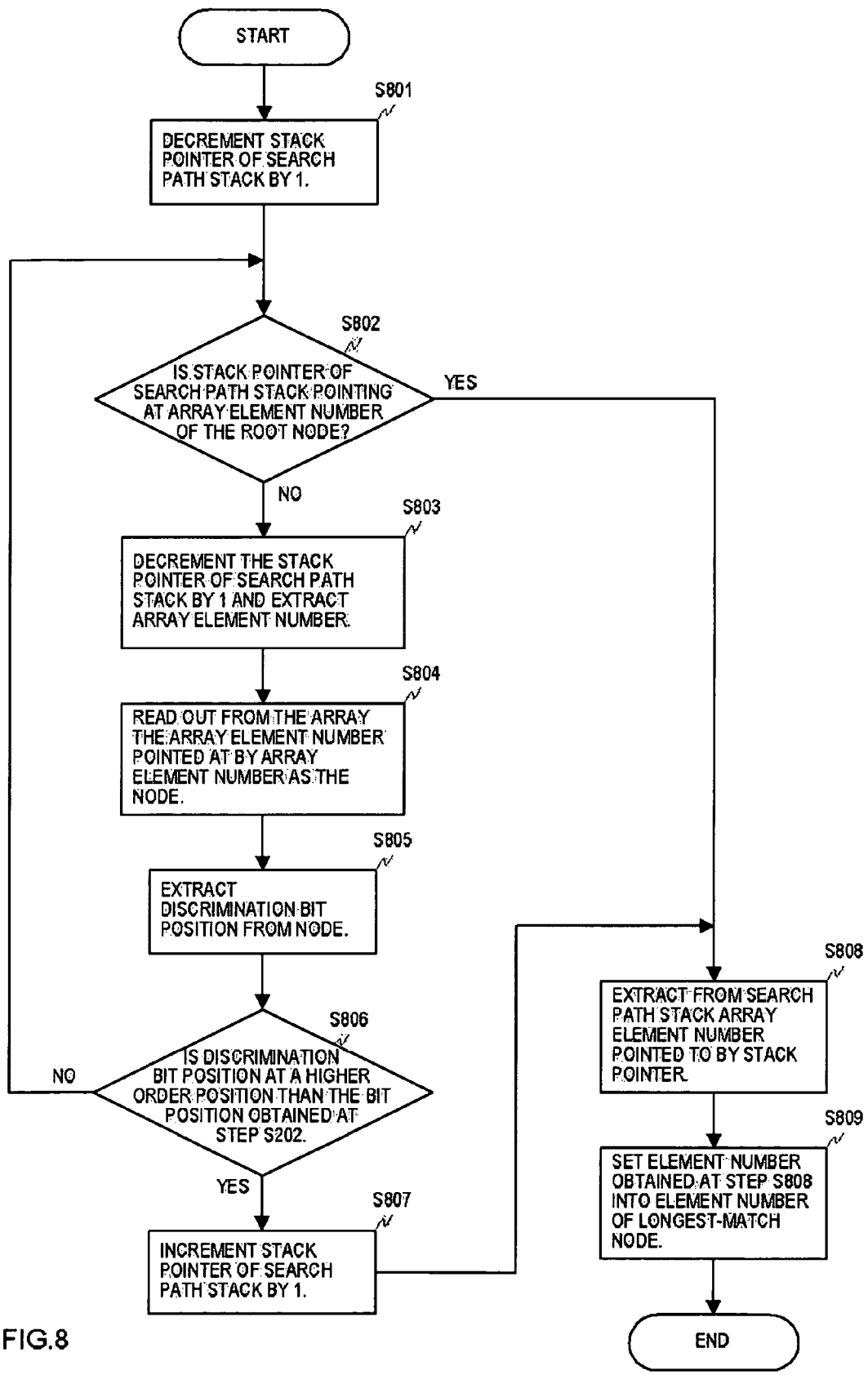
FIG. 8 is a flowchart showing the processing for acquiring the longest-match node.

Next, the processing to acquire the longest-match node performed in step S606 of FIG. 6 is described referencing FIG. 8.

In order to facilitate the understanding of the processing in FIG. 8, the description will be divided into three cases, cases (A1) to (A3).

Case (A1) is the case wherein the root node is a leaf node.

In this case, the index key acquired in step S603 of FIG. 6 is the index key stored in the root node.

Consequently, if the difference bit position between the longest-match search key and the index key is larger than 0, the index key satisfies the longest-match condition and the root node corresponds to the longest-match node.

Also, it is clear from step S605 of FIG. 6 that, since the processing of FIG. 8 can be done only if the difference bit position is larger than 0, in the case of (A1) the root node is always set as the longest-match node as a consequence of the processing of FIG. 8.

Specifics are provided below.

In step S801, the stack pointer for search path stack 310 is decremented by 1.

Also, in the case of (A1), the array element number for array 309 stored in search path stack 310 is only the array element number for the root node.

Consequently, after executing step S801, the contents of the stack pointer point to the array element number for the root node.

In this status the processing proceeds to step S802.

In step S802, a determination is made whether the stack pointer for search path stack 310 points to the array element number for the root node.

In the case of (A1), since that is so, the determination becomes "Yes" and processing proceeds to step S808.

In step S808, the array element number pointed to by the stack pointer is extracted from search path stack 310.

In other words, in the case of (A1) the array element number for the root node is extracted.

Then, continuing, in step S809, the array element number extracted in step S808, i.e., the array element number for the root node is set as the array element number for the longest-match node, and the processing of FIG. 8 is terminated.

Case (A2) is the case wherein the root node is a branch node and the discrimination bit position of the root node is 0.

This case includes coupled node trees subject to searches for both index keys with a 0 in the 0th bit and for those with a 1 in the 0th bit.

Consequently, an index key that coincides at the 0th bit must always exist.

This means that an index that satisfies the longest-match condition always exists and the difference bit position acquired in step S604 of FIG. 6 is larger than 0.

In other words, in the case of (A2), the determination in step S605 always becomes "No" and the processing of FIG. 8 is always executed.

In step S801, the stack pointer for search path stack 310 is decremented by 1.

As a result, the contents pointed to by the stack pointer becomes the array element number of the leaf node holding the index key acquired in step S603.

In the case of (A2), this leaf node is not the root node.

After executing step S801, the loop of steps S802 to S806 is repeatedly executed. This loop traces back up search path stack 310.

In step S802, a determination is made whether the stack pointer for search path stack 310 points to the array element number of the root node.

In the case of (A2), the first time step S802 is executed the determination becomes "no," and processing proceeds to step S803.

In step S803, the stack pointer for search path stack 310 is decremented by 1, and array element number pointed to by stack pointer is acquired.

Continuing, in step S804, the array element pointed to by the array element number acquired in step S803 is read out from array 309. Then, in the next step S805, the discrimination bit position is extracted from the node read out in step S804.

Also, steps S803 to S806 are only executed if the determination in step S802 is "No."

Consequently, in step S803, it is guaranteed that an underflow will not occur when the stack pointer is decremented by one.

Also, it can be understood from FIG. 4 and the description of step S802 that there is one or more array element numbers of nodes other than the root node in search path stack 310.

Consequently, after step S803 is executed, the stack pointer points to the array element number of the branch node that is the root node or a branch node other than the root node.

In the step S806 following step S805, a determination is made whether the extracted discrimination bit position is a higher position than the difference bit position obtained in step S102 of FIG. 10.

If the discrimination bit position is a higher position than the difference bit position, the determination becomes "Yes" and processing proceeds to step S807. If the extracted discrimination bit position is a lower position, the determination becomes "No" and processing returns to step S802.

In the case of (A2), the loop of steps S802 to S806 is always repeatedly executed until the determination in step S806 becomes "Yes," and processing proceeds successively to steps S807, S808, and S809.

In step S807, the stack pointer for search path stack 310 is incremented by 1 and since what step S807 executes is after step S803 was executed one or more times, the operation of step S807 cannot cause an overflow.

Continuing, in step S808, the array element number pointed to by the stack pointer is extracted from search path stack 310, and, in the next step S809, array element number extracted in step S808 is set as the array element number of the longest-match node and the processing of FIG. 8 is terminated.

In the case of (A2) the above processing sets as the longest-match node one of either of the next two nodes.

If the discrimination bit position of the branch node linking to the leaf node that holds the index key acquired in step S603 is a higher position than the difference bit position, that leaf node is set as the longest-match node.

If the array element number of a branch node with the discrimination bit position "m" and, linked to that node, the array element number of a branch node with the discrimination bit position "n", both sequentially stored in search path stack 310, and the relation among the discrimination bit position "m" and the discrimination bit position "n" and the difference bit position "d" is m<d<n, the branch with the discrimination bit position "n" is set as the longest-match node.

Case (A3) is the case wherein the root node is a branch node and the discrimination bit position of the root node is greater than 0.

This case also differs from case (A2) in the point that the determination in step S605 of FIG. 6 becomes "Yes."

The processing is the same as for (A2) in that in step S801 the stack pointer for the search path stack is decremented by 1 and the first time that the loop of steps S802 to S806 is executed, the determination in step S802 is always "No" and, continuing, the processing of steps S803 to S806 is the same.

If in step S806 the determination becomes "No" and return is made to step S802, once again a determination is made in step S802.

Case (A3) differs from case (A2) in that for (A3) the determination in step S802 for the second and following executions becomes "Yes".

As described above, in the first execution of step S802 the determination always becomes "No". For the second and later executions of step S802, step S806 comes immediately before and the determination in step S806 is "No."

In other words, the result of repeatedly executing the loop one or more times is a case of tracing back through search path stack 310 until the stack pointer points to the array element number of the root node, and the determination in step S802 only becomes "Yes" when the discrimination bit position of the root node is a lower position than the difference bit position.

When the determination in step S802 is "Yes", processing proceeds to step S808 and, just as in the case (A1), the array element number of the root node is set as the array element number of the longest-match node, and the processing of FIG. 8 is terminated.

Since for case (A3) the discrimination bit position of the root node is larger than 0, the discrimination bit position of the root node and the difference bit position "d" have the following relationship.

All the index keys included in the coupled node tree have the same bits in bit positions 0 to "m−1".

Also, for case (A3), when the determination in step S802 is "Yes" the relation is 0<d<m.

Consequently, in this case, the bits 0 to "d−1" of all the index keys included in the coupled node tree coincide with the same bits of the longest-match search key.

Thus, as was described above, for this case, the array element number of the root node is set as the array element number of the longest-match node.

Also, just as for case (A2), in case (A3) to the loop of steps S802 to S806 is always repeatedly executed until the determination in step S806 becomes "Yes," and processing proceeds successively to steps S807, S808, and S809.

In this case the contents of the processing are the same as for case (A2).

Figure 11:
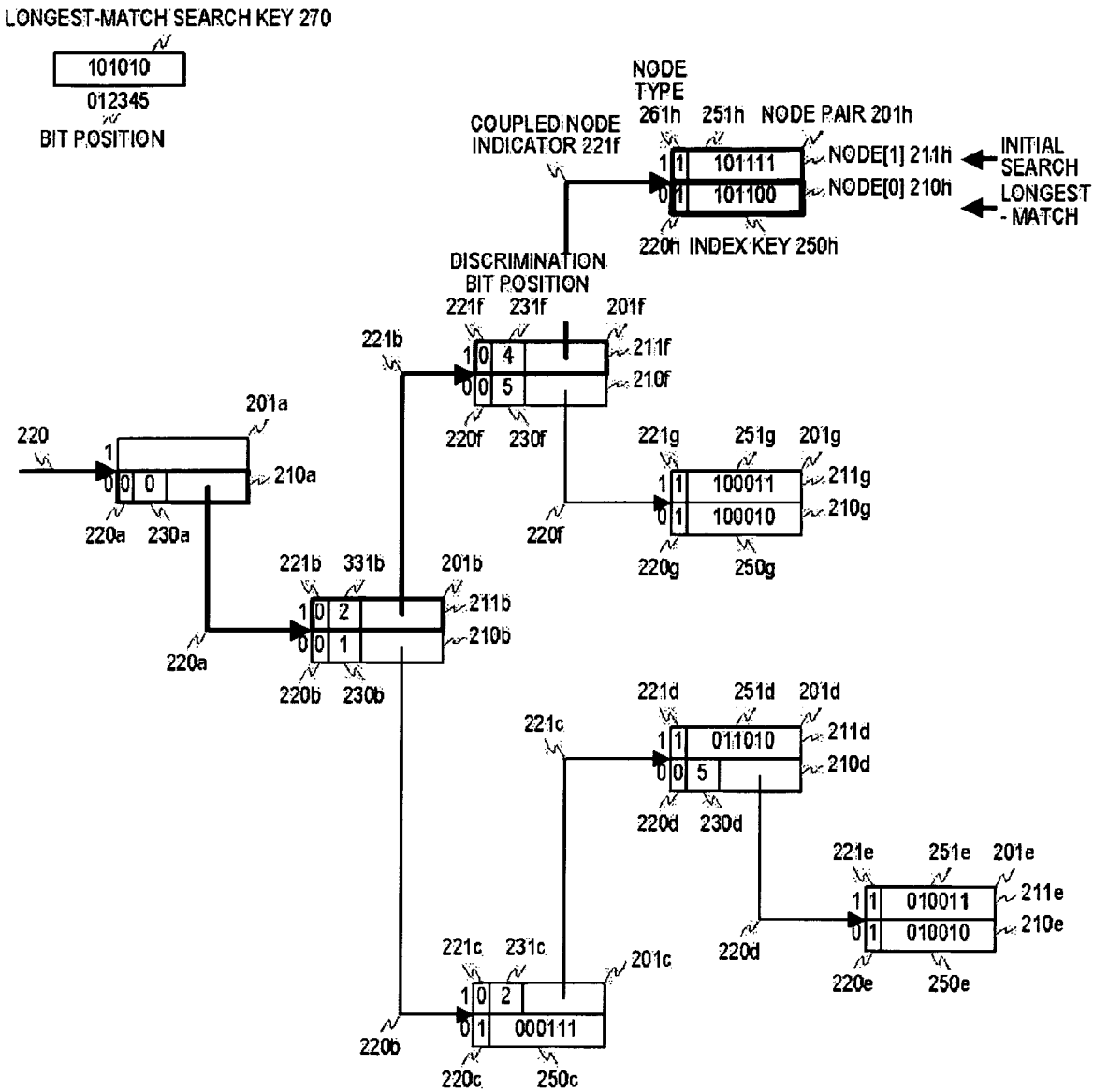
FIG. 11 is a drawing describing one example of a longest-match search using a coupled node tree.

Next, referencing FIG. 11, a concrete example of longest-match searching is described.

The coupled node tree of FIG. 11 includes the 8 index keys "000111", "010010", "010011", "011010", "100010", "100011", "101100", and "101111".

Figure 12:
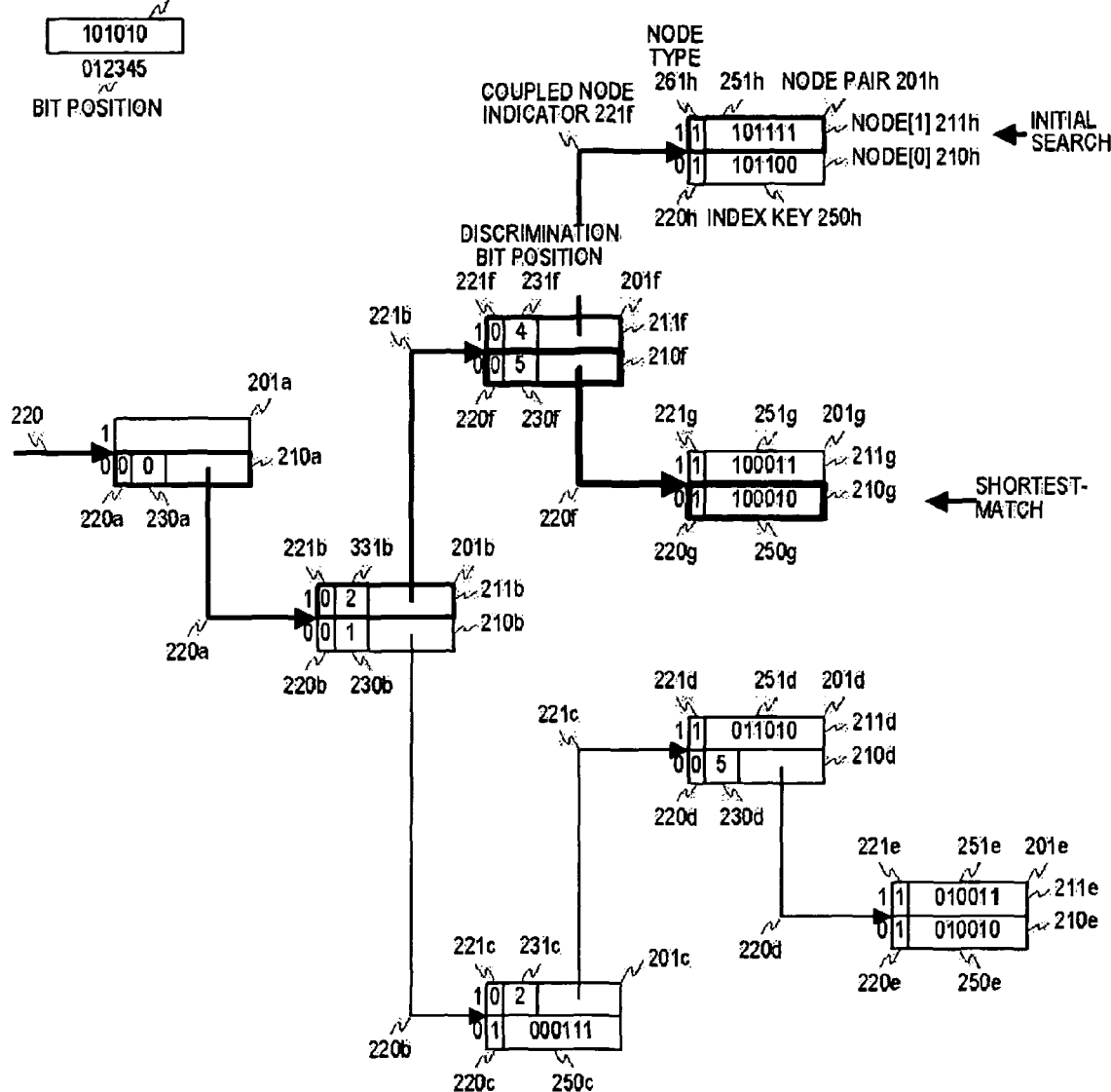
FIG. 12 is a drawing describing one example of a shortest-match search using a coupled node tree.

Since the coupled node trees of FIG. 11 and FIG. 12 have the same configuration, the same reference codes are used.

However, the value of the discrimination bit position 231f of node 211f, the value of the index key 250h of node 210h, and the value of the index key 251h of node 211h differ from those in FIG. 2B.

The description below is for the case where "101010" is specified for the longest-match search key.

In step S601 of FIG. 6, "101010" is set as the search key, and in step S602, the root node is set as the search start node.

After the processing of FIG. 4 is called in step S603, search path stack 310 will contain in sequence the array element numbers 220, (220a+1), (221b+1), and (221f+1).

Also, the index key obtained in step S603 is the "101111" stored in index key 251h of node 211h which is the array element with the array element number (221f+1).

This is shown by the "initial search" next to the node 211h in FIG. 11.

In step S604, the difference bit position between the value "101111" of the index key 251h and the value "101010" of the search key is determined, and since that value 3 is larger than 0 the determination in step S605 becomes "No." For that reason, step S606, i.e. the processing of FIG. 8, is executed.

By repeated executing of the steps S802 to S806 the search path stack 310 is traced back and when array element number (220a+1) is obtained, the discrimination bit position 231b of node 211b stored in the array element with array element number (220a+1) is 2, and since the relation between the discrimination bit position and the difference bit position is 2<3, the determination in step S806 is "Yes".

Consequently, in step S807, the stack pointer is incremented by 1 and, in step S808, the array element number (221b+1) is extracted and array element number (221b+1) is set as the array element number of the longest-match node.

In other words, the node 211f stored in the array element with the array element number (221b+1) is set as the longest-match node.

Here, processing returns to FIG. 6 and, in step S607, the node 211f is set as the search start node and the processing of step S608, i.e., the minimum value search of FIG. 5, is performed.

As shown in FIG. 11, the leaf nodes with a child relationship to node 211f, which is the branch node specified as the longest-match node, are the two leaf nodes node 210h and node 211h.

The index key values of those nodes are "101100" and "101111" respectively.

The 0th to 2nd bit of both coincide with the value "101010" of the longest-match search key and the 3rd bit does not coincide.

Also, the other 6 index keys in the coupled node tree all have a difference bit position less than 3 in relation to the longest-match search key "101010".

By the processing of step S608, the minimum value "101100" is selected from among the key values "101100" and "101111" and the processing of FIG. 6 is terminated.

Next, a concrete method for a shortest-match search in a coupled node tree is described referencing FIG. 7, FIG. 9, FIG. 10, and FIG. 12.

Figure 7:
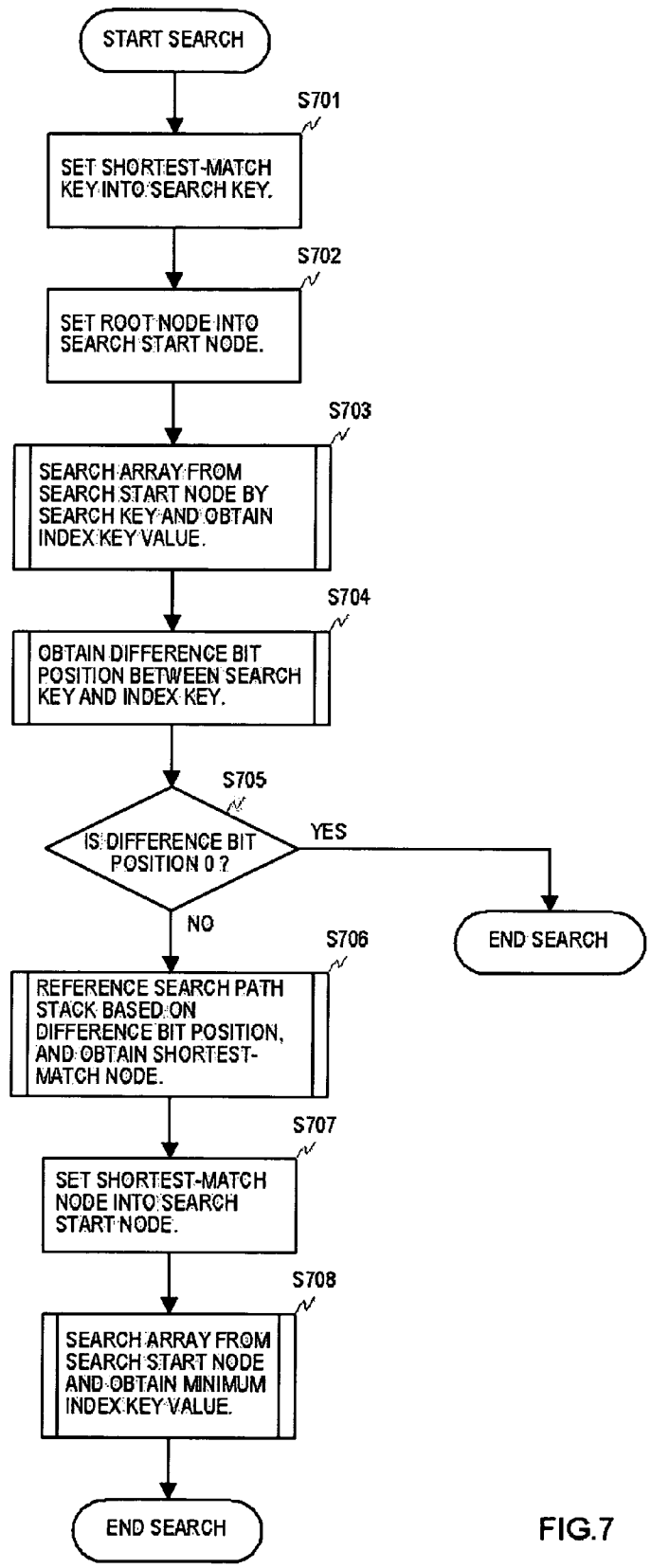
FIG. 7 is a flowchart showing the shortest-match search processing according to the preferred embodiment of this invention.

FIG. 7 is a flowchart of shortest-match search processing in one preferred embodiment of this invention. FIG. 7 is equivalent to FIG. 6 with "longest-match" changed to "shortest-match."

First, in step S701 the shortest-match search key is made the search key and in step S702 the root node is set in the search start node.

Next, in step S703, the search key set in step S701 is used to search the array and an index key is acquired. This search is the same as that shown in FIG. 4.

Since the root node is set in the search start node in step S702, the object of the search is the whole coupled node tree. The contents stored in search path stack 310 during the search of step S703 is used later in step S706. After an index key is acquired, processing proceeds to step S704.

In step S704, the difference bit position between the search key set in step S701, i.e., the shortest-match search key, and the index key obtained in step S703 is determined.

The details of this processing have already be explained along with FIG. 10. However, when the processing of FIG. 10 is called out in step S704, the difference with a longest-match search is that the comparison key 1 set in step S101 is the shortest-match search key and the comparison key 2 obtained in step S703 is the index key.

After executing step S704, there is a determination in step S705 whether the difference bit position obtained in step S704 is "0."

If the difference bit position is "0," the determination is "Yes" and shortest-match search processing terminates.

In this case, the shortest-match search key and the index key obtained in step S703 have a non-coincidence in the leading 0th bit.

Also, due to the configuration of a coupled node tree, all the other index keys included in the coupled node tree also do not coincide with the shortest-match search key on the leading 0th bit.

Thus, the result obtained from the search is that "No index key exists that satisfies the shortest-match condition."

If the difference bit position is not 0 the determination in step S705 becomes "No" and processing proceeds to step S706. In this case, at least one index key exists in the coupled node tree that satisfies the shortest-match condition.

However, since, at the stage of step S705, only the existence of an index key that satisfies the shortest-match condition has been ascertained, in step S706, a specific shortest-match node is acquired.

Also if all the index keys of the leaf nodes in a given subtree satisfy the shortest-match condition, the root node of that subtree is defined as the shortest-match node.

In step S706, the array element numbers of array 309 stored in search path stack 310 during the search in step S703 are referenced and the shortest-match node is acquired based on the difference bit position obtained in step S704.

After acquiring the shortest-match node, in the next step S707, the shortest-match node is set as the search start node.

Then, in the following step S708, the minimum value search processing shown in FIG. 5 is executed from the search start node, and the minimum value of the index keys that satisfy the shortest-match condition is obtained and the obtained minimum value is output as the result of the shortest-match search, and shortest-match search processing is terminated.

Also, just as in FIG. 6, steps S707 and S708 can be modified depending on the preferred embodiment.

Figure 9:
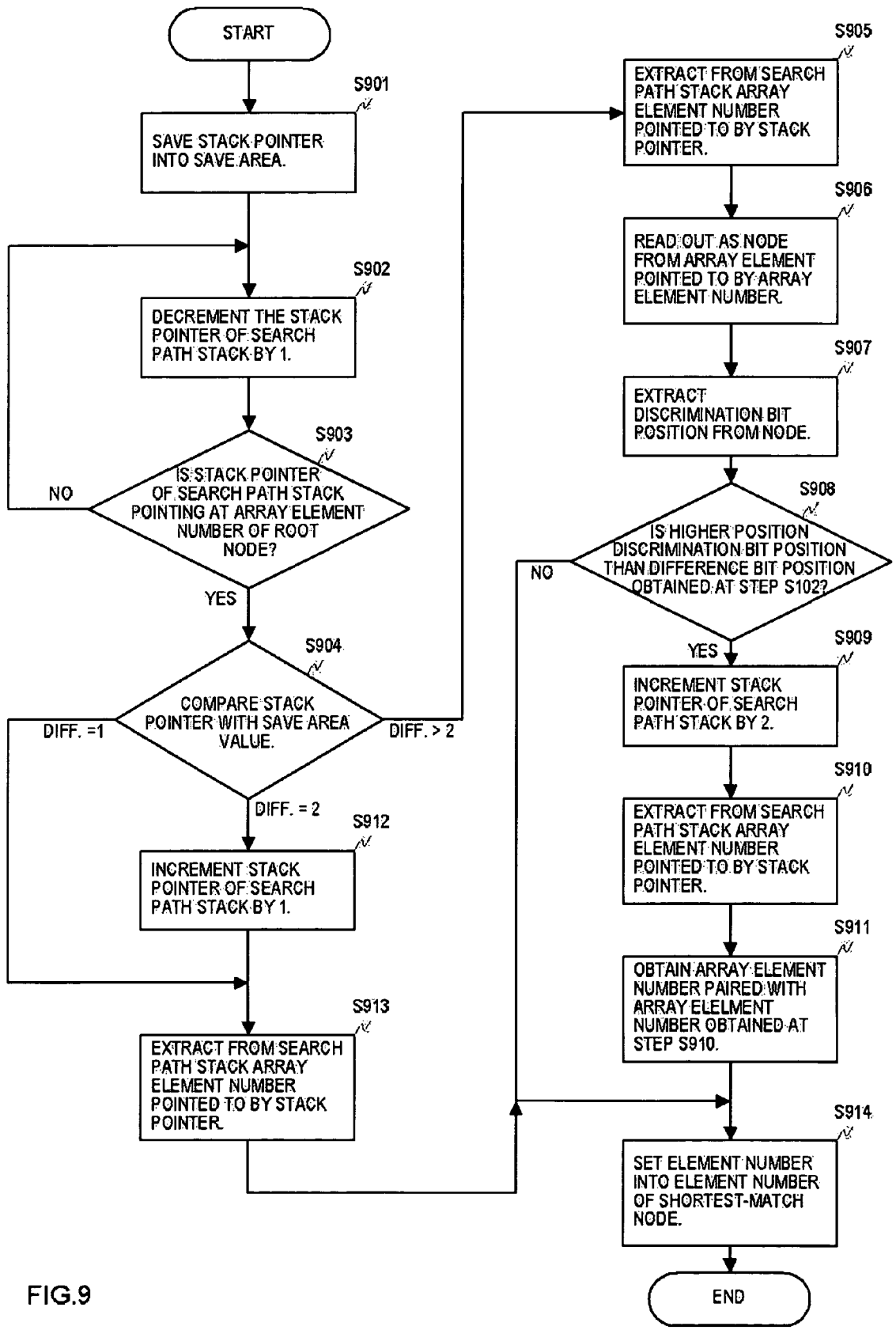
FIG. 9 is a flowchart showing the processing for acquiring the shortest-match node.

Next, the processing to acquire a shortest-match node that is done in step S706 of FIG. 7 is described referencing FIG. 9.

The processing in FIG. 9 is processing in compliance with the definition of shortest-match condition in (b) above, but in order to facilitate understanding of the processing in FIG. 9, the description is divided into 4 cases, cases (B1) to (B4).

Cases (B1) and (B2) are cases wherein the results of a search using a shortest-match key is that at least 3 array element numbers of nodes are stored in the search path stack, and cases (B3) and (B4) are cases other than that.

Case (B1) is the case wherein the root node is a branch node, and there exists at least 1 branch node other than the root node on the path from the root node to the leaf node that contains the index key acquired in step S703, and when the discrimination bit position of the root node is taken as "m" there exists at least one index key that coincides with the shortest-match search key in the range from the 0th bit to the m-th bit.

In this case at least 3 nodes exist on the above path. The array element numbers of the root node, the branch node that is a child of the root node and the branch node that is the child of that node have been stored sequentially in search path stack 310. In accordance with the definition of (b) above, in this case, the node that is a pair of the node with the array element number stored in search path stack 310 and linked to the branch node that is a child node of the root node corresponds to the shortest-match node. The processing of FIG. 9 for this case (B1) is the processing that sets this node in the shortest-match node.

First, in step S901 the stack pointer for search path stack 310 is set in a backup area.

Continuing, steps S902 and S903 form a loop that is executed repeatedly one or more times. This loop expresses a traverse back up search path stack 310 until the stack pointer points to the array element number of the root node. First, in step S902, the stack pointer for search path stack 310 is decremented by 1. Continuing, in step S903, a determination is made whether the stack pointer for search path stack 310 points to the array element of the root node.

If the stack pointer points to the array element of the root node, the determination becomes "Yes" and processing proceeds to step S904 and in all other cases the determination becomes "No" and processing returns to step S902.

In step S904, the stack pointer is compared with the value in the backup area. Here step S904 is only executed when the stack pointer points to the array element number of the root node. In other words, step S904 is the processing to check how far the stack pointer just before the processing of FIG. 9 begins is from the stack pointer that points to the array element number of the root node, and the value in the backup area is compared with the stack pointer, and the processing branches depending on the difference.

In the case of (B1), since the array element numbers of at least 3 nodes are stored in search path stack 310, the comparison result in step S904 is always "difference greater than 2." Consequently, the next processing after step S904 is always step S905.

In step S905, the array element number pointed to by the stack pointer, i.e., the array element number of the root node, is extracted from search path stack 310. Continuing, in step S906, the array element pointed to by the array element number extracted in step S905 is read out from array 309. In the next step S907, the discrimination bit position is extracted from the node read out in step S906, i.e., the root node.

Continuing, in step S908, a determination is made whether the discrimination bit position read out in step S907 is a higher position that the difference bit position obtained in step S102 of FIG. 10. If the discrimination bit position is a higher position than the difference bit position, the determination becomes "Yes" and processing proceeds to step S909. If it is a lower position, the determination becomes "No" and processing proceeds to step S914.

In the case of (B1), the determination in step S908 always becomes "Yes". The reason is as follows.

Since the processing of FIG. 9 is only executed when the difference bit position is greater than 0, the determination of step S908 always becomes "Yes" when the discrimination bit position of the root node extracted in step S907 is 0.

Also, if the discrimination bit position of the root node extracted in step S907 larger than 0 and if the discrimination bit position of the root node extracted in step S907 is taken as "m", all the index keys included in the coupled node tree have the same bits in bit positions 0 to "m−1".

Also, for case (B1), at least one index key exists that coincides with the bits up to the m-th bit of the shortest-match search key.

Consequently, since all the index keys included in the coupled node tree coincide with the shortest-match search key in the range of bits 0 to the (m−1) bit, the relation between the discrimination bit position m and the difference bit position d is that of "m" is less than or equal to "d". Consequently, the determination in step S908 always becomes "Yes."

When the determination in step S908 is "Yes", in step S909, the stack pointer for search path stack 310 is incremented by 2.

Continuing, in step S910, array element number pointed to by the stack pointer is acquired from search path stack 310.

In the next step S911, the array element number for the node that pairs with the array element number obtained in step S910 is obtained.

After executing step S911, processing proceeds to step S914, and the array element number obtained in step S911 is set as the array element number of the shortest-match node. Then the processing of FIG. 9 terminates.

(B2) illustrates the case where the root node is a branch node and in the path from the root node to a leaf node that contains the index key acquired in step S703 there exists at least one branch node other than the root node and no index key exists that coincides with the shortest-match search key in the range from the 0th bit to the m-th bit if the discrimination bit position of the root node is taken as "m".

The only difference between this case and case (B1) is that no index key exists that coincides with the shortest-match search key in the range from the 0th bit to the m-th bit. Consequently, the processing up to step S907 is exactly the same as for (B1).

In step S908 following step S907, the determination is "No" in the case of (B2) and processing moves to step S914.

In this case the array element number is the array element number extracted in step S905, that is, the array element number of the root node.

Consequently, in step S914 the array element number of the root node is set as the array element number of the shortest-match node and processing is terminated.

Case (B3) is the case wherein the root node is a branch node and a leaf node that contains the index key acquired in step S703 is linked to the root node.

In this case only 2 nodes exist on the above path. In other words, search path stack 310 has the status of holding the array element number of a leaf node that contains an index key and the array element number of the root node.

The steps S901 to S903 are also the same for (B3) as they are for (B1).

However, the comparison result in the step S904 that follows step S903 is different than in the case for (B1).

For (B3) the stack pointer is compared with the value set in the backup area in step S901 and the result "difference=2" is obtained. Consequently, the next processing after step S904 is always step S912.

In step S912, the stack pointer for search path stack 310 is incremented by 1.

In the next step S913, the array element number in search path stack 310 pointed to by the stack pointer is extracted. In other words, the array element number of a leaf node is extracted.

Then processing proceeds to step S914 and the array element number of the leaf node extracted in step S913 is set as the array element number of the shortest-match node and processing terminates.

Case (B4) is the case wherein the root node is a leaf node. In this case the index key obtained in step S703 of FIG. 7 is the index key stored in the root node. Consequently, if the difference bit position between the shortest-match search key and the index key is larger than 0, the index key satisfies the shortest-match condition and the root node corresponds with the shortest-match node.

Also, as is clear from step S705 of FIG. 7, since processing of FIG. 9 only occurs if the difference bit position is larger than 0, in the case of (B4), the root node is always set as the shortest-match node by the processing of FIG. 9. Processing details follow.

Step S901 is the same as for the case (B1).

Continuing, in step S902, the value of the stack pointer is decremented by 1. Also, in the case of (B4), the array element number for array 309 stored in search path stack 310 is the array element number of the root node. Consequently, after executing step S902, the array element number pointed to by the stack pointer is the array element number of the root node. Processing proceeds to step S903 in this condition.

In step S903, a determination is made whether the stack pointer for search path stack 310 points to the array element number of the root node. In the case of (B4) this is true and the result of the determination is "Yes" and processing moves to step S904.

In step S904, the value of the stack pointer and the value in the backup area are compared. In the case of (B4), the result obtained is "difference=1" and in accordance with this result processing moves to step S913.

In step S913, the array element number pointed to the stack pointer for search path stack 310, i.e., the array element number of the root node, is extracted. Then, in the following step S914, array element number of the root node is set in the array element number of the shortest-match node and the processing of FIG. 9 terminates.

Next, referencing FIG. 12, a detailed example of a shortest-match search is explained. The coupled node tree of FIG. 12 is exactly the same as that in FIG. 11. The following description assumes that "101010" is specified as the shortest-match search key.

Since the processing from steps S701 to S705 of FIG. 7 is exactly the same as that in the example of FIG. 11, their explanation will be omitted. In step S705, "No" is determined and step S706, i.e. the processing of FIG. 9, is executed.

First, in step S901, the value of the stack pointer is set in the backup area. Next, the search path stack 310 is traced back by repeating steps S902 and S903, and when array element number 220 is obtained the determination in step S903 is "Yes" and processing proceeds to step S904.

At this point, the values of the stack pointer and that in the backup area are compared and the result is processing proceeds to step S905 and the discrimination bit position 230*a* of root node 210*a* is extracted by steps S905 to S907.

Since the value of discrimination bit position 230*a* is 0, the determination in step S908 is "Yes" and in step S909 the stack pointer is incremented by 2.

As a result, in step S910, the array element number (221*b*+1) is obtained and in step S911 the array element number 221*b* that is paired with that is obtained. Consequently, in step S914, array element number 221*b* is set as the array element number of the shortest-match node.

Here the processing returns to FIG. 7, and in step S707 the node 210*f* which is the shortest-match node is set as the search start node and the processing of step S708, i.e., the minimum value search of FIG. 5, is done. Just as in FIG. 12, the child leaf nodes of node 210*f*, which is the branch node in which is set the shortest-match node, are nodes 210*g* and 211*g*. The index key values of both nodes are "100011" and "100010", respectively. Both have coincidence with the shortest-match search key "101010" at bits 0 to 1 and have non-coincidence at bit 2.

When comparing the discrimination bit positions of the branch nodes in the path from the root node, the discrimination bit position 230*a* of root node 210*a* is 0 and the discrimination bit position 231*b* of the next node 211*b* is 2. Consequently, these two index keys have coincidence with the shortest-match search key in the range from the 0 to 0 bit and have a non-coincidence in the range from the 1 to 2 bit.

The other index keys included in the coupled node tree are the index keys 250*c*, 251*d*, 250*e*, and 251*e*, which do not satisfy the prefix match condition, and the index keys 250*h* and 251*h*, which have coincidence in bits 0 to 2 but non-coincidence in bit 3.

As a result, it can be understood that, in a shortest-match search, the index key with the smallest prefix match is searched on the priority basis from the index keys that have a prefix match with the shortest-match search key, In the above preferred embodiment, the value "100010", which is the minimum value between "100011" and "100010", is selected by step S708.

Also, the preferred embodiments of this invention are not limited to the above description and various other embodiments are possible.

In the above preferred embodiment, the leftmost physical bit position was taken to correspond with the highest logical bit position but other correspondence relationships are possible in other preferred embodiments and, for example, the rightmost bit can be made the highest level bit.

The determinations in step S806 of FIG. 8 and step S908 of FIG. 9 are determinations based on a logical bit position.

Also, the above longest-match search obtains, as a result, the minimum value of the index keys that satisfy the longest-match condition.

However, it is possible to modify the above longest-match search processing in accordance with various preferred embodiments in order to obtain other appropriate search results.

In the same way, various search results can also be obtained for the shortest-match search depending on the preferred embodiment.

The loop of steps S902 to S903 in FIG. 9 traces back up search path stack 310 one element at a time but, for example, this loop can be replaced by a step that substitutes, for the stack pointer, a stack pointer that points to the array element number of the root.

Also, the detailed definition of a shortest-match search can be modified variously depending on the preferred embodiment. If the value of the difference bit position obtained in step S704 of FIG. 7 is a value between discrimination bit positions of the root node and the branch node immediately below the root node, the processing of FIG. 9 can be modified and the branch node immediately below the root node can be set as the shortest-match node.

Also, if the discrimination bit position of the root node is larger than 0 and smaller than the difference bit position obtained in step S704, another modification is possible. In this case, the index key that has highest difference bit position compared with the shortest-match search key is an index key stored in a leaf node of the subtree whose root node is the node paired with the node that is stored in search path stack 310 in the search of step S703 and that is directly linked to the root node.

Consequently, if the determination of step S908 is "Yes" and the value of the discrimination bit position of the root node is larger than 0, the processing of FIG. 9 can be modified so as to increment the stack pointer by 1 in step S909.

If the difference bit position obtained in steps S704 is smaller than the value of the discrimination bit position of the root node, the processing of FIG. 9 can be modified and the root node can be set as the shortest-match node.

Also, if the value of the discrimination bit position of root node is larger than 0 and smaller the value of the difference bit position obtained in step S704, the array element number of the node that is a pair with the node with the array element number extracted in step S913 can be set as the array element number of the shortest-match node.

Also the methods of the longest-match/shortest-match searches described above can, of course, be executed on a computer by a program.

What is claimed is:

1. A longest-match search apparatus searching for index keys composed of bit strings that satisfy a longest-match condition with a longest-match search key composed of a bit string, based on a tree data structure that holds the index keys composed of bit strings that are the object of searches by means of the longest-match search key, comprising:

a coupled node tree having a root node and a node pair, the node pair being a branch node and leaf node, or a pair of branch nodes, or a pair of leaf nodes located in adjacent storage areas, wherein the root node is a node that expresses a starting point of the tree and which is a leaf node when there is one node in the tree and a branch node when there is two or more nodes in the tree, and the branch node includes a discrimination bit position of the search key for the bit string search and position information indicating a position of a primary node of a primary node, which is one node of a node pair of a link target, and the leaf node includes an index key that is a bit string that is the target of a search, and wherein by repeating linkage, at the branch node, to a primary node or a node at a position in a memory area adjacent thereto of a node pair of the link target from an arbitrary node of the tree as a search start node in accordance with a bit value in a search key at a discrimination bit position included in the branch node, until the leaf node is reached, an index key stored in the leaf node is made a search result key, which is a search result using the search key of an arbitrary subtree having the search start node as its root node;

a search means repeating linkage, at the branch node, to a primary node or a node at a position in a memory area adjacent thereto of a node pair of the link target from the root node of the coupled node tree as the search start node in accordance with a bit value in the search key, that is a specified longest-match search key, at the discrimination bit position included in the branch node, until the leaf node is reached, while memorizing a search path from the root node to the leaf node, thus obtaining an index key stored in the leaf node as the search result key;

a difference bit position acquiring means comparing the bit strings of the longest-match search key and the search result key and acquiring the highest bit position of the bits for which the value differs as a difference bit position; and a longest-match node setting means setting a longest-match node by referring to the search path that is memorized, when the difference bit position is not the highest position in the bit string, and if the root node is a leaf node or if the root node is a branch node but the discrimination bit position of the root node is lower than the difference bit position, then setting the root node as the longest-match node, and otherwise, setting as the longest-match node the leaf node or branch node that is memorized by the search means next to the branch node with the lowest discrimination bit position of all the branch nodes that are on the search path and that have a discrimination bit position higher than the difference bit position.

2. The longest-match search apparatus according to claim 1, further comprising an index key acquiring means selecting a leaf node included in the subtree of the coupled node tree which has the longest-match node as its root node and acquiring the index key included in the leaf node.

3. A longest-match search method searching for index keys executed by the longest-match search apparatus according to claim 1, comprising:

a search step repeating linkage, at the branch node, to a primary node or a node at a position in a memory area adjacent thereto of a node pair of the link target from the root node of the coupled node tree as the search start node in accordance with a bit value in the search key, that is a specified longest-match search key, at the discrimination bit position included in the branch node, until the leaf node is reached, while memorizing a search path from the root node to the leaf node, thus obtaining an index key stored in the leaf node as the search result key;

a difference bit position acquiring step comparing the bit strings of the longest-match search key and the search result key and acquiring the highest bit position of the bits for which the value differs as a difference bit position; and a longest-match node setting step setting a longest-match node by referring to the search path that is memorized, when the difference bit position is not the highest position in the bit string, and if the root node is a leaf node or if the root node is a branch node but the discrimination bit position of the root node is lower than the difference bit position, then setting the root node as the longest-match node, and otherwise, setting as the longest-match node the leaf node or branch node that is memorized at the search step next to the branch node with the lowest discrimination bit position of all the branch nodes that are on the search path and that have a discrimination bit position higher than the difference bit position.

4. The longest-match search method according to claim 3, further comprising an index key acquiring step selecting a leaf node included in the subtree of the coupled node tree which has the longest-match node as its root node and acquiring the index key included in the leaf node.

5. The longest-match search method according to claim 3, wherein the coupled node tree is stored in an array, and the position information is an array number of an array element of the array in which a node corresponding to the position information is stored, and the search path is memorized by successively storing in a stack the array element numbers of the array elements in which are stored the nodes on the search path.

6. A shortest-match search apparatus searching for index keys composed of bit strings that satisfy a shortest-match condition with a shortest-match search key composed of a bit string, based on a tree data structure that holds the index keys composed of bit strings that are the object of searches by means of the shortest-match search key, comprising:

a coupled node tree having a root node and a node pair, the node pair being a branch node and leaf node, or a pair of branch nodes, or a pair of leaf nodes located in adjacent storage areas, wherein the root node is a node that expresses a starting point of the tree and which is a leaf node when there is one node in the tree and a branch node when there are two or more nodes in the tree, and the branch node includes a discrimination bit position of the search key for the bit string search and position information indicating a position of a primary node of a primary node, which is one node of a node pair of a link target, and the leaf node includes an index key that is a bit string that is the target of a search, and wherein by repeating linkage, at the branch node, to a primary node or a node at a position in a memory area adjacent thereto of a node pair of the link target from an arbitrary node of the tree as a search start node in accordance with a bit value in a search key at a discrimination bit position included in the branch node, until the leaf node is reached, an index key stored in the leaf node is made a search result key, which is a search result using the search key of an arbitrary subtree having the search start node as its root node;

a search means repeating linkage, at the branch node, to a primary node or a node at a position in a memory area adjacent thereto of a node pair of the link target from the root node of the coupled node tree as the search start node in accordance with a bit value in the search key, that is a specified shortest-match search key, at the discrimination bit position included in the branch node, until the leaf node is reached, while memorizing a search path from the root node to the leaf node, thus obtaining an index key stored in the leaf node as the search result key;

a difference bit position acquiring means comparing the bit strings of the shortest-match search key and the search result key and acquiring the highest bit position of the bits for which the value differs as a difference bit position; and a shortest-match node setting means setting a shortest-match node by referring to the search path that is memorized, when the difference bit position is not the highest position in the bit string, and if the search path includes the root node and a branch node that is one of the node pair that is a link target of the root node and the discrimination bit position of the root node has a higher position than the difference bit position, then setting as a shortest-match node a node paired with the node that is memorized by the search means next to the branch node.

7. The shortest-match search apparatus according to claim 6, further comprising an index key acquiring means selecting a leaf node included in the subtree of the coupled node tree which has the shortest-match node as its root node and acquiring the index key included in the leaf node.

8. A shortest-match search method searching for index keys executed by the shortest-match search apparatus according to claim 6, comprising:
- a search step repeating linkage, at the branch node, to a primary node or a node at a position in a memory area adjacent thereto of a node pair of the link target from the root node of the coupled node tree as the search start node in accordance with a bit value in the search key, that is a specified shortest-match search key, at the discrimination bit position included in the branch node, until the leaf node is reached, while memorizing a search path from the root node to the leaf node, thus obtaining an index key stored in the leaf node as the search result key;
- a difference bit position acquiring step comparing the bit strings of the shortest-match search key and the search result key and acquiring the highest bit position of the bits for which the value differs as a difference bit position; and
- a shortest-match node setting step setting a shortest-match node by referring to the search path that is memorized, when the difference bit position is not the highest position in the bit string, and
- if the search path includes the root node and a branch node that is one of the node pair that is a link target of the root node and the discrimination bit position of the root node has a higher position than the difference bit position, then setting as a shortest-match node a node paired with the node that is memorized at the search step next to the branch node.

9. The shortest-match search method according to claim 8, further comprising an index key acquiring step selecting a leaf node included in the subtree of the coupled node tree which has the shortest-match node as its root node and acquiring the index key included in the leaf node.

10. The shortest-match search method according to claim 8, wherein
- the coupled node tree is stored in an array, and the position information is an array number of an array element of the array in which a node corresponding to the position information is stored, and the search path is memorized by successively storing in a stack the array element numbers of the array elements in which are stored the nodes on the search path.

11. A program that a computer is caused to execute, for performing the longest-match search method according to claim 3.

12. A computer readable medium for storing a program that a computer is caused to execute, for performing the longest-match search method according to claim 3.

13. A program that a computer is caused to execute, for performing the shortest-match search method according to claim 8.

14. A computer readable medium for storing a program that a computer is caused to execute, for performing the shortest-match search method according to claim 8.

* * * * *